United States Patent [19]
Itoh et al.

[11] Patent Number: 5,642,475
[45] Date of Patent: Jun. 24, 1997

[54] APPARATUS AND METHOD FOR EDITING GRAPHICS OR GROUP GRAPHICS DISPLAYED ON A SCREEN AND CORRELATED TO EACH OTHER

[75] Inventors: Yasunari Itoh, Kahoku-gun; Taiji Okamoto; Satoshi Kikuchi, both of Kawasaki; Masahiro Yanagawa; Atsuko Kasai, both of Kahoku-gun, all of Japan

[73] Assignees: Fujitsu Limited, Kawasaki; PFU Limited, Kahoku, both of Japan

[21] Appl. No.: 297,947

[22] Filed: Aug. 31, 1994

[30] Foreign Application Priority Data

Dec. 2, 1993 [JP] Japan .................................. 5-302876

[51] Int. Cl.⁶ .................................................... G06T 11/00
[52] U.S. Cl. .................................................. 395/133; 395/135
[58] Field of Search ................................. 395/133–139, 395/127, 152, 153, 154, 155, 160, 161

[56] References Cited

U.S. PATENT DOCUMENTS 4,600,919  7/1986  Stern ............................ 395/120 X
5,261,041 11/1993  Susman .......................... 395/152

FOREIGN PATENT DOCUMENTS 0 461 577 12/1991 European Pat. Off. .
0 497 327  8/1992 European Pat. Off. .
92/21095  11/1992 WIPO .

OTHER PUBLICATIONS

Tang et al. "Pacers: Time–Elastic Objects" Proceedings of the ACM Symposium on UIST (1993).

*Primary Examiner*—Almis R. Jankus
*Attorney, Agent, or Firm*—Staas & Halsey

[57] ABSTRACT

An apparatus and method for editing different graphics displayed on a screen and correlated to each other. More specifically, according to various embodiments of the invention, an apparatus and method are provided for editing a hierarchically structured graphic forming a hierarchical structure with a plurality of group graphics, independently editing each graphic forming a group graphic, and changing the view of a first graphic related to a second graphic in response to changes of attributes of the second graphic.

23 Claims, 27 Drawing Sheets

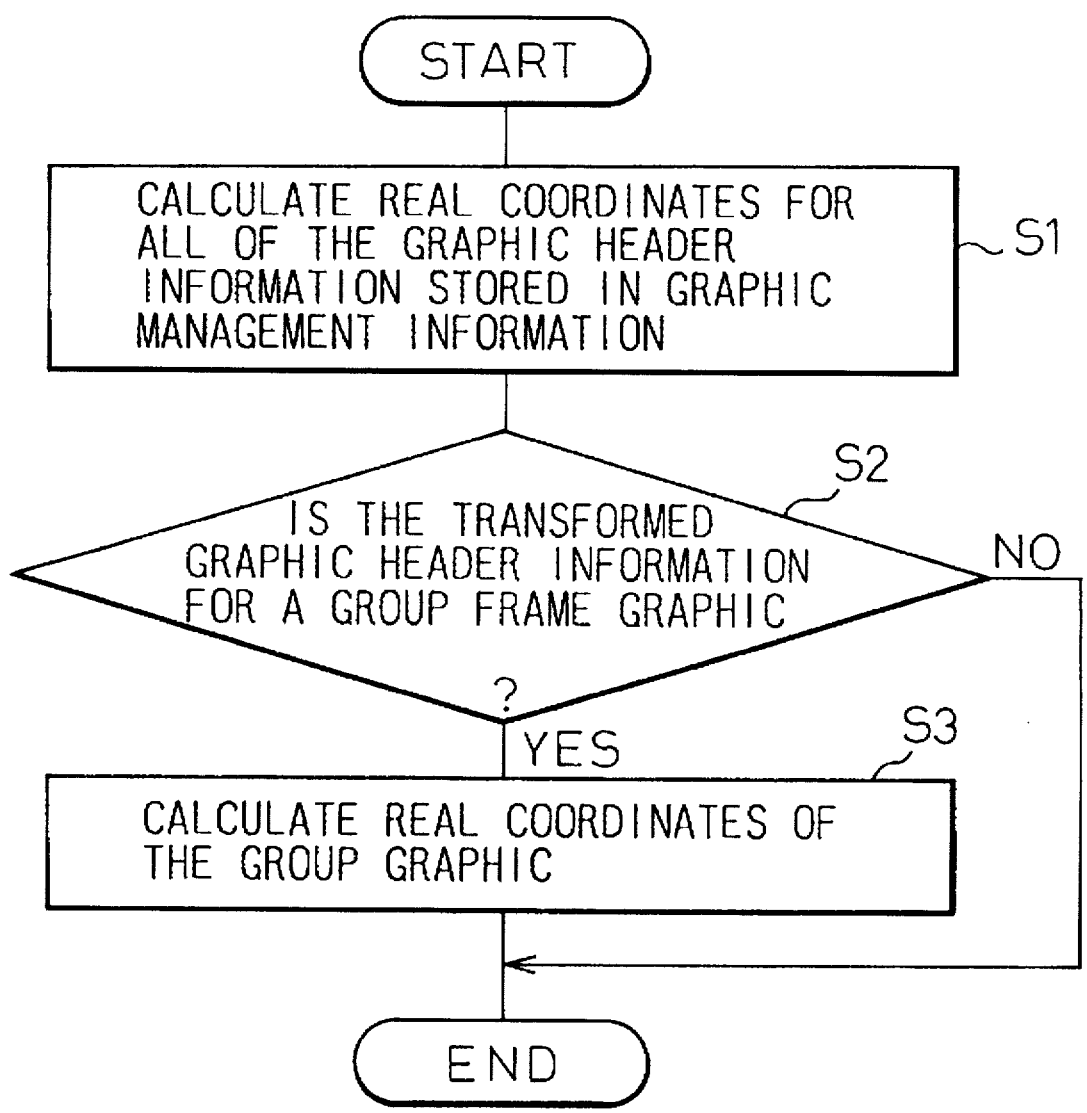

Fig. 13
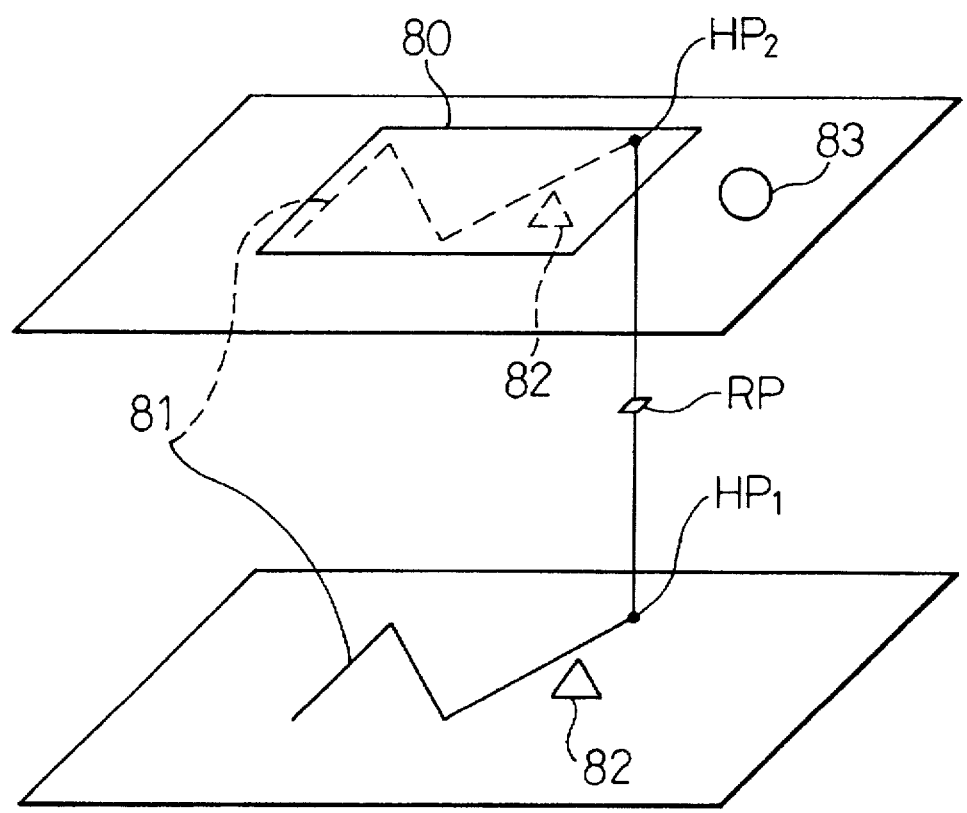
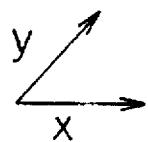

TRANSFORMATION

TO STEP S7 IN FIG. 23

Fig. 25A  Fig. 25B
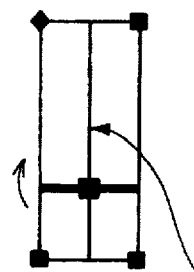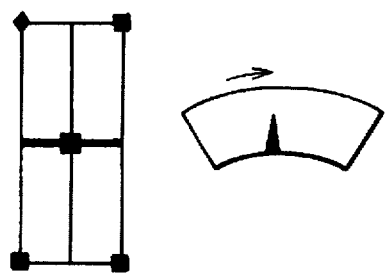
SLIDER ATLRIBUTE VALUE
CHANGE BY MOUSE
Fig. 25C
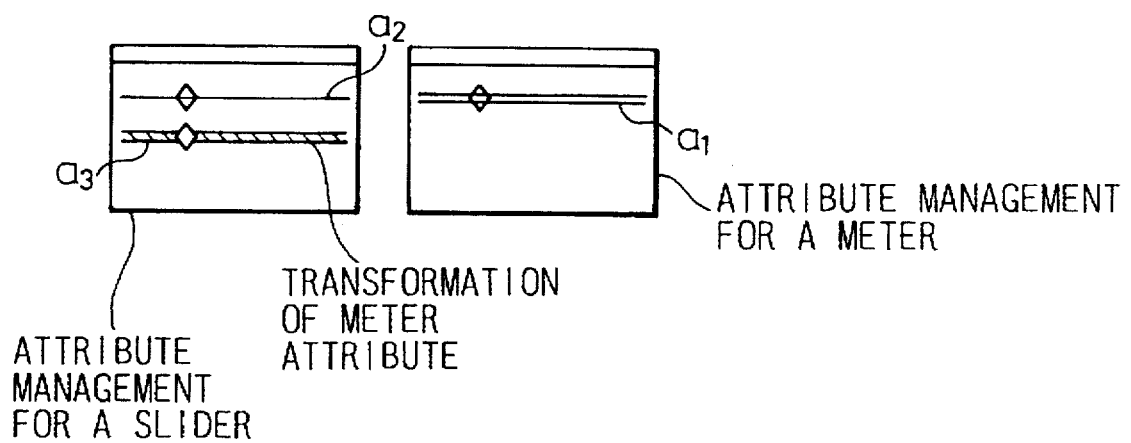
ATTRIBUTE
MANAGEMENT
FOR A SLIDER
TRANSFORMATION
OF METER
ATTRIBUTE
ATTRIBUTE MANAGEMENT
FOR A METER

APPARATUS AND METHOD FOR EDITING GRAPHICS OR GROUP GRAPHICS DISPLAYED ON A SCREEN AND CORRELATED TO EACH OTHER

BACKGROUND OF THE INVENTION

(1) Field of the invention

The present invention relates to a graphic editing apparatus and method, and more particularly, to a graphic editing apparatus and method for creating or editing graphics on a screen such as animated images. Regarding the editing of graphics on the screen, there are several kinds of edits such as change of position, deformation, such as deforming a circle to an ellipse, enlargement or reduction, rotation, change of state such as color or brightness, and others.

(2) Description of the Related Art

In the past, a graphic editing apparatus based on a computer has handled a moving graphic such as an animated image according to a method in which a position of a graphic on a display unit at each time instant is described using a predetermined script or a method in which all the positions or shapes of a graphic at respective time instants are designated independently.

According to the former method, the relationships between the position of a graphic and time instant must be expressed as equations and position change information must be designated. It is therefore hard to determine the relationships between the time instant and position of a graphic during creating or editing graphics. In particular, creating or editing a plurality of varying graphics is very hard to do. It is also hard to designate finely-varying states. Especially, editing work for varying a plurality of graphics simultaneously is very complex because time instants that are turning points of variations must be consistent among graphics.

In a method in which all shapes of a graphic varying time-sequentially are designated at respective time instants, the position and shape of a graphic must be delineated in every screen sent at each time instant (hereinafter, a frame). An enormous amount of labor is required for creating or editing. After creating or editing is completed, (1) when a graphic is to be moved more quickly or slowly, all frames must be re-edited, and (2) when time instants at which graphics vary synchronously are to be modified, all graphics in frames concerned must be re-edited. Thus, correction is hard to do.

When a conventional method is adopted, it is hard to edit not only a graphic varying time-sequentially but also a graphic varying depending on the value of a certain attribute.

In the prior arts, when a plurality of graphics of parts are to be created with the locations of the parts held intact, the locations of the parts are placed in memory and divided into groups. A group is regarded as a single graphic. Deformation such as enlargement, reduction, rotation, or the like, or movement is executed relative to the whole of a group.

In the conventional methods, however, when it is required to deform a particular one of graphics belonging to a group, the group graphics must be broken up to execute deformation. When a group is broken up, the positional relationships between the graphic and the other graphics are destroyed. During the deformation, an editor must deform or move the other graphics separately.

According to the specification of the PCT application No. PCT/JP 93/01303 filed on Sep. 10, 1993, a graphic editing apparatus and method, intended to solve the above mentioned problems, provides a means for creating or editing a graphic varying with the passage of time or the change in value of an attribute. The editing apparatus and method described in the PCT application No. PCT/JP 93/01303, performs editing of graphics in the following steps when editing a graphic related with another graphic or a group graphic containing a plurality of graphics, for example, when editing a first graphic related with a second graphic or the group graphic, each of which changes in accordance with the first graphic's movement, deformation, rotation or enlargement. The first step is to obtain a numerical attribute value for a reference line corresponding to a change in the first graphic. The second step is to edit the second graphic or the group graphic related with the first graphic, by means of a program, using the numeric attribute.

Here the reference line means a line created by using a mouse on a screen, on which line a movable point of a movable point graphic (cursor) moves in response to a change of a graphic in accordance with the graphic's movement, deformation, color change or others. Refer to the specification of the PCT application No. PCT/JP 93/01303 for further details. An attribute of a graphic means something changeable, for example, it can be an attribute of movement, deformation, color or the like regarded as a change based on the position of a graphic or a change based on the passage of time. An attribute value means numerical data when a change of the attribute is represented by the numerical data.

In accordance with conventional arts, it was necessary to execute the following steps when each graphic in a group graphic having a plurality of graphics is to be independently edited for movement, deformation, rotation, enlargement, or the like. The first step is to prepare two screens, a No.1 screen for showing a graphic in the group graphic to be independently edited for movement, deformation, rotation, enlargement, or the like, and a No.2 screen for showing the group graphic in which the location of the independently edited graphic is sliced. The second step is to independently edit the graphic on the No.1 screen. Third step is to make the No.1 and No.2 screens properly overlapped.

In accordance with conventional arts, when a lower graphic or a lower group graphic in a hierarchically structured graphic is to be independently edited by means of coordinate transformation, it was necessary to execute complicated procedures such as the programming of coordinate transformation for the lower graphic or the lower group graphic and displaying a graphic of the total hierarchical structure of the upper and lower graphics and/or the upper and lower group graphics after the programming.

In accordance with conventional arts, it was also necessary to execute the following steps when displaying numerical data or a change of a first graphic such as movement, deformation, rotation, enlargement, or the like, corresponding to a change of a second graphic such as movement, deformation, rotation, enlargement, or the like. The first step is to get numerical data from position data of a movable point on a reference line corresponding to the change of the second graphic. The second step is to directly display the data through a program or to display the other graphic to be changed in accordance with the numerical data.

The graphic editing apparatus and method of the prior arts requires much time and labor for editing graphics because complicated programming or positioning between overlapped screens or the like is required.

SUMMARY OF THE INVENTION

The present invention has been made in view of the foregoing problems and it is therefore a main object of the present invention to provide a graphic editing apparatus and method which eliminates the aforementioned problems and improves on the invention described in the specification of the PCT international application No. PCT/JP 93/01303, whereby each graphic constituent of a group graphic can be independently edited or accessed through a program, as if it were a part of the group graphic without causing any influences on the rest of the group graphic.

It is a first object of the present invention to provide an graphic editing apparatus which allows the editing of a first group graphic on a screen, wherein a second group graphic is displayed in different area from that of the first graphic on the screen with a determined relationship to the first group graphic, and when editing the second group graphic, the first group graphic is automatically generated having the determined relationship to the second group graphic, and vice versa. Here, the group graphic contains a plurality of graphics. According to the apparatus, it is possible to edit a first group graphic in a normal coordinate system instead of editing a second group graphic having a determined relationship to the first group graphic which may have a distorted coordinate system. In addition, it is also possible to relate a second released point on the second group graphic with a first graphic outside the second group graphic on the same coordinate system, then a first released point on the first group graphic automatically moves on the screen along with its drawing part, namely a constituent of the first group graphic, in response to the movement, deformation, or the like, of the first graphic.

It is a second object of the present invention to provide a graphic editing apparatus and method that allows to edit a graphic or a group graphic containing a plurality of graphics to be changed related with another graphic or another group graphic, in other words, a graphic or a group graphic is moved, deformed, rotated, enlarged, or the like in response to movement, deformation, rotation, enlargement, or the like of the related graphic.

It is a third object of the present invention to provide a graphic editing apparatus and method that allows independent editing of each graphic in a group graphic containing a plurality of graphics, and allows each graphic to be moved, deformed, rotated, enlarged, or the like.

It is a fourth object of the present invention to provide a graphic editing apparatus and method that allows independent editing by means of coordinate transformation of a lower graphic or a lower group graphic in a hierarchically structured graphic consisting of upper and lower graphics and/or upper and lower group graphics.

It is a fifth object of the present invention to provide a graphic editing apparatus and method that allows the display of numerical data, or the display of another graphic to be moved, deformed, rotated, enlarged, or the like, in response to movement, deformation, rotation, enlargement, or the like of the graphic.

According to an apparatus for creating or editing graphics to realize the first object of the present invention, the apparatus comprises an intermediate means for creating a group graphic on a screen so as to have a determined relationship to another group graphic on the screen. Here, the group graphic contains a plurality of graphics. In the apparatus, after creating a first group graphic from a second group graphic through the intermediate means, the second group graphic can be automatically generated with the determined relationship to the first group graphic in accordance with editing of the first group graphic. The same applies to automatically generating the first group graphic.

According to another apparatus to realize the first object of the present invention, the graphic editing apparatus is characterized in that the first group graphic has a first released point HP1 on the line of the first group graphic, the second group graphic has a second released point HP2 corresponding to the first released point on the line of the second group graphic, and the intermediate means has information of an imaginary released point RP interposed between the first and second released points. The second released point is related to a first graphic outside the second group graphic which has a same coordinate system as that of the second group graphic. The second released point is related to the first graphic such that the second released point moves in response to movement, deformation, or the like of the first graphic. The first released point automatically moves on the screen in accordance with a predetermined kind of release of the the first released point HP1 in response to the movement, deformation, or the like, of the first graphic. The kind of release includes deformation, rotation, enlargement, and mode dependency. Mode dependency is predetermined by a basic editing means and functions to perform automatically editing in accordance with the preselected mode.

According to a method to realize the second object of the present invention, a graphic editing method for creating or editing graphics or group graphics, each group graphic containing a plurality of graphics and being handled as a single graphic, utilizing a graphic editing apparatus having a processing unit for creating or editing graphics to be displayed on a screen, a display unit for displaying the graphics created or edited on the screen, and a position designating unit for use in designating positions on the screen of the display unit and inputting the position data to the processing unit, characterized in that it comprises the steps of:

creating a graphic reference line in a graphic display area on the screen, which is defined by transforming attribute changes resulting from movement, deformation, rotation, enlargement, color, or the like, of a first graphic in the first and a second graphics or in the first graphic and a first group graphic, or a first group graphic in the first and a second group graphics or in the first graphic and the first group graphic, into changes of positions on the screen of the display unit;

creating a first attribute reference line in an attribute display area on the screen, which is defined by transforming the graphic reference line into changes of positions on the screen of the display unit;

creating a second attribute reference line transformed from the first attribute reference line in the attribute display area as an attribute reference line corresponding to the second graphic or the second group graphic;

creating synchronous transmission information which includes address data of attribute information for the first attribute reference line corresponding to attribute information of the second attribute reference line and address data for attribute information of the second attribute reference line corresponding to attribute information of the first attribute reference line; and editing graphics so that the attribute of the second graphic or the second group graphic may be changed in response to a change of the attribute of the first graphic or the first group graphic.

According to a method to realize the third object of the present invention, a graphic editing method for creating or editing group graphics each containing a plurality of graphics and being handled as a single graphic, utilizing a graphic editing apparatus having a processing unit for creating or editing graphics to be displayed on a screen, a display unit for displaying the graphics created or edited on the screen, and a position designating unit for use in designating positions on the screen of the display unit and inputting the position data to the processing unit, characterized in that it comprises the steps of:

- determining at least one point as a released point in a determined graphic inside a group frame graphic surrounding a group graphic containing a plurality of graphics;
- storing the released point and the group frame graphic as group frame graphic information;
- storing graphics inside the group frame graphic other than the determined graphic having the released point as stationary graphic information;
- displaying the graphics stored as the stationary graphic information without any change; and
- displaying only the determined graphic having the released point so as to be independently changed resulting from movement, deformation, rotation, enlargement, or the like, of the determined graphic.

According to a method to realize the fourth object of the present invention, a graphic editing method for creating or editing a main hierarchically structured graphic forming a hierarchical structure with a plurality of graphics and a plurality of group graphics utilizing a graphic editing apparatus having a processing unit for creating or editing graphics to be displayed on a screen, a display unit for displaying the graphics created or edited on the screen, and a position designating unit for use in designating positions on the screen of the display unit and inputting the position data to the processing unit, characterized in that it comprises the steps of:

- storing coordinate transformation information for the main hierarchically structured graphic in a main group management information for managing the main hierarchically structured graphic and coordinate transformation information for a sub-hierarchically structured graphic in a sub-group management information for managing a sub-hierarchically structured graphic having a determined group graphic, the main hierarchically structured graphic including the sub-hierarchically structured graphic as a lower class;
- transforming a coordinate of the sub-hierarchically structured graphic based on the coordinate transformation information stored in the sub-group management information when editing the sub-hierarchically structured graphic; and
- displaying the sub-hierarchically structured graphic in accordance with the transformed coordinate of the sub-hierarchically structured graphic.

According to another method to realize the fourth object of the present invention, the graphic editing method is characterized in that the coordinate transformation information in group management information which manages the group graphic is obtained by multiplying each coordinate transformation information in series in each group management information of each group graphic having hierarchically structured relationship between the group graphics.

According to still another method to realize the fourth object of the present invention, the graphic editing method is characterized in that the coordinate transformation information in group management information is obtained from coordinate transformation information in the group management information of the highest hierarchical group graphic of all the group graphics having a hierarchically structured relationship.

According to a method to realize the fifth object of the present invention, a graphic editing method for creating or editing a plurality of graphics utilizing a graphic editing apparatus having a processing unit for creating or editing graphics to be displayed on a screen, a display unit for displaying the graphics created or edited on the screen, and a position designating unit for use in designating positions on the screen of the display unit and inputting the position data to the processing unit, characterized in that it comprises the steps of:

- creating a graphic reference line having a first movable point in a graphic display area on the screen of the display unit, which is obtained by transforming changes of attributes resulting from movement, deformation, rotation, enlargement, color, or the like, of a determined graphic into changes of position on the screen;
- creating an attribute reference line in an attribute display area on the screen of the display unit, which is obtained by transforming the graphic reference line into changes of position on the screen;
- interpolating the positions of the first movable point graphic on the graphic reference line corresponding to changes of the attribute to obtain numerical data;
- moving the first movable point graphic on the graphic reference line in accordance with the numerical data;
- moving a second movable point graphic on the attribute reference line in accordance with changes of positions of the first movable point graphic on the graphic reference line; and
- calculating numerical data corresponding to changes of the attribute of the determined graphic from changes of positions of the second movable point graphic on the attribute reference line.

According to another method to realize the fifth object of the present invention, the graphic editing method is characterized in that the numerical data or a change resulting from movement, deformation, rotation, enlargement, color, or the like, of a graphic is displayed in response to changes of the attributes.

According to an apparatus to realize the second object of the present invention, a graphic editing apparatus for creating or editing graphics or group graphics, each group graphic containing a plurality of graphics and being handled as a single graphic, having a processing unit for creating or editing graphics to be displayed on a screen, a display unit for displaying the graphics created or edited on the screen, and a position designating unit for use in designating positions on the screen of the display unit and inputting the position data to the processing unit, characterized in that it comprises:

- a graphic editing means for creating graphic reference lines in a graphic display area on the screen, which are defined by transforming attribute changes resulting from movement, deformation, rotation, enlargement, color, or the like, of a first graphic in the first and a second graphics or in the first graphic and a first group graphic, or a first group graphic in the first and a second group graphics or in the first graphic and the first group graphic, into changes of positions on the screen of the display unit;
- a graphic displaying means for displaying graphics or the graphic reference lines created by the graphic editing means in the graphic display area;

an attribute editing means for creating attribute reference lines in an attribute display area on the screen which are defined by transforming the attribute changes into changes of positions on the screen; and an attribute displaying means for displaying the attribute reference lines created by the attribute editing means in the attribute display area;

wherein the attribute editing means comprises the steps of:

selecting one of the attribute reference lines as a first attribute reference line;

creating a second attribute reference line transformed from the first attribute reference line in the attribute display area as an attribute reference line corresponding to the second graphic or the second group graphic;

creating synchronous transmission information which includes address data for attribute information of the first attribute reference line corresponding to attribute information of the second attribute reference line and address data for attribute information of the second attribute reference line corresponding to attribute information of the first attribute reference line; and editing graphics so that the attribute of the second graphic or the second group graphic may be changed in response to a change of the attribute of the first graphic or the first group graphic by an attribute transforming means.

According to an apparatus to realize the third object of the present invention, a graphic editing apparatus for creating or editing group graphics each containing a plurality of graphics and being handled as a single graphic, having a processing unit for creating or editing graphics to be displayed on a screen, a display unit for displaying the graphics created or edited on the screen, and a position designating unit for use in designating positions on the screen of the display unit and inputting the position data to the processing unit, characterized in that it comprises:

a graphic editing means for creating graphic reference lines in a graphic display area on the screen, which are defined by transforming attribute changes resulting from movement, deformation, rotation, enlargement, color, or the like, of a first graphic in the first and a second graphics or in the first graphic and a first group graphic, or a first group graphic in the first and a second group graphics or in the first graphic and the first group graphic, into changes of positions on the screen of the display unit;

a graphic displaying means for displaying graphics or the graphic reference lines created by the graphic editing means in the graphic display area;

an attribute editing means for creating attribute reference lines in an attribute display area on the screen which are defined by transforming the graphic reference lines into changes of positions on the screen of the display unit; and an attribute displaying means for displaying the attribute reference lines created by the attribute editing means in the attribute display area;

wherein the graphic editing means comprises the steps of:

determining at least one point as a released point in a determined graphic inside of a group frame graphic surrounding a group graphic containing a plurality of graphics;

storing the released point and the group frame graphic as group frame graphic information;

storing graphics inside the group frame graphic other than the determined graphic having the released point as stationary graphic information;

displaying the graphics stored as the stationary graphic information without any change; and editing the group graphic, to be displayed by a group graphic creating means, such that only the determined graphic having the released point so as to be independently changed resulting from movement, deformation, rotation, enlargement, or the like of the determined graphic.

According to an apparatus to realize the fourth object of the present invention, a graphic editing apparatus for creating or editing a main hierarchically structured graphic forming a hierarchical structure with a plurality of graphics and a plurality of group graphics, having a processing unit for creating or editing graphics to be displayed on a screen, a display unit for displaying the graphics created or edited on the screen, and a position designating unit for use in designating positions on the screen of the display unit and inputting the position data to the processing unit, characterized in that it comprises:

a graphic editing means for creating graphic reference lines in a graphic display area on the screen, which are defined by transforming attribute changes resulting from movement, deformation, rotation, enlargement, color, or the like, of a first graphic in the first and a second graphics or in the first graphic and a first group graphic, or a first group graphic in the first and a second group graphics or in the first graphic and the first group graphic, into changes of positions on the screen of the display unit;

a graphic displaying means for displaying graphics or the graphic reference lines created by the graphic editing means in the graphic display area;

an attribute editing means for creating attribute reference lines in an attribute display area on the screen which are defined by transforming the graphic reference lines into changes of positions on the screen of the display unit; and an attribute displaying means for displaying the attribute reference lines created by the attribute editing means in the attribute display area;

wherein the graphic editing means comprises the steps of:

storing coordinate transformation information for the main hierarchically structured graphic in a main group management information for managing the main hierarchically structured graphic and coordinate transformation information for a sub-hierarchically structured graphic in sub-group management information for managing a sub-hierarchically structured graphic having a determined group graphic, the main hierarchically structured graphic including the sub-hierarchically structured graphic as a lower class;

transforming a coordinate of the sub-hierarchically structured graphic based on the coordinate transformation information stored in the sub-group management information by means of coordinate editing means when editing the sub hierarchically structured graphic;and displaying the sub hierarchically structured graphic in accordance with the transformed coordinate of the sub hierarchically structured graphic.

According to another apparatus to realize the fourth object of the present invention, the graphic editing apparatus is characterized in that, the coordinate transformation information in group management information which manages the group graphic is obtained by multiplying each coordinate transformation information in series in each group management information of each group graphic having hierarchically structured relationship between the group graphics.

According to still another apparatus to realize the fourth object of the present invention, the graphic editing apparatus is characterized in that, the coordinate transformation information in group management information is obtained from coordinate transformation information in the group management information of the highest hierarchical group graphic of all group graphics having hierarchically structured relationship.

According to an apparatus to realize the fifth object of the present invention, a graphic editing apparatus for creating or editing a plurality of graphics, having a processing unit for creating or editing graphics to be displayed on a screen, a display unit for displaying the graphics created or edited on the screen, and a position designating unit for use in designating positions on the screen of the display unit and inputting the position data to the processing unit, characterized in that it comprises:

a graphic editing means for creating graphic reference lines in a graphic display area on the screen, which are obtained by transforming attribute changes resulting from movement, deformation, rotation, enlargement, color, or the like of a graphic or a group graphic in two graphics, in a graphic and a group graphic, or in two group graphics, into changes of positions on the screen of the display unit;

a graphic displaying means for displaying graphics or the graphic reference lines created by the graphic editing means in the graphic display area;

an attribute editing means for creating attribute reference lines in an attribute display area on the screen which are defined by transforming the graphic reference lines into changes of positions on the screen; and an attribute displaying means for displaying the attribute reference lines created by the attribute editing means in the attribute display area;

wherein the graphic editing means comprises the steps of:

creating a graphic reference line having a first movable point in a graphic display area on the screen of the display unit, which is obtained by transforming changes of attributes resulting from movement, deformation, rotation, enlargement, color, or the like, of a determined graphic into changes of positions on the screen;

interpolating positions of the first movable point graphic on the graphic reference line corresponding to changes of the attribute to obtain numerical data;

moving the first movable point graphic of the graphic reference line in accordance with the numerical data;

wherein the attribute editing means comprises the steps of:

creating an attribute reference line in an attribute display area on the screen of the display unit, which is defined by transforming changes of graphic reference line into changes of positions on the screen;

moving a second movable point graphic on the attribute reference line in accordance with changes of positions of the first movable point graphic of the graphic reference line; and calculating numerical data corresponding to changes of the attribute of the determined graphic from changes of positions of the second movable point graphic of the attribute reference line.

According to another apparatus to realize the fifth object of the present invention, the graphic editing apparatus is characterized in that the numerical data or a change resulting from movement, deformation, rotation, enlargement, color, or the like of a graphic is displayed in response to changes of the attributes.

In accordance with the apparatus and method to realize the first object of the present invention for graphic editing apparatus and method, it is permitted that attribute values of graphics can be used in a program, communication between two attribute information becomes possible so that two graphics can be correlated to one another with attribute changes thereof, and access to a lower graphic in a hierarchically structured graphic becomes possible so that the lower graphic can be independently edited.

In accordance with the apparatus and method to realize the second object of the present invention for graphic editing apparatus and method, it is permitted that editing operations of a graphic or a group graphic having a plurality of graphics to be changed correlated with another graphic or another group graphic, for example, editing the graphic or the group graphic, be changed in the same way as changes of the correlated graphic resulting from movement, deformation, rotation or enlargement.

In accordance with the apparatus and method to realize the third object of the present invention for graphic editing apparatus and method, editing operations of each graphic in a group graphic having a plurality of graphics can be independently performed based on changes resulting from movement, deformation, rotation, enlargement, or the like of the graphic.

In accordance with the apparatus and method to realize the fourth object of the present invention for graphic editing apparatus and method, editing operations with coordinate transformation of a lower graphic or a lower group graphic in a hierarchically structured graphic consisting of upper and lower graphics and/or upper and lower group graphics can be independently performed.

In accordance with the apparatus and method to realize the fifth object of the present invention for graphic editing apparatus and method, displaying operations of a numerical data corresponding to a change of a graphic resulting from movement, deformation, rotation, enlargement, or the like, or displaying operations of a change of another graphic resulting from movement, deformation, rotation, enlargement, or the like, corresponding to the change of the graphic resulting from movement, deformation, rotation, enlargement, or the like, can be performed.

BRIEF DESCRIPTION OF THE DRAWINGS

The present invention will be more clearly understood from the description as set forth below with reference to the accompanying drawings, wherein:

FIG. 10 is a flow chart of a process of transforming a coordinate axis of a group graphic by rotating the group graphic;

FIG. 13 is an explanatory drawing of a released point;

FIG. 25 shows a meter on the right side and a slider having a released cursor on the left side;

FIG. 25B shows the meter and the slider after boost up the cursor of the slider by a mouse;

FIG. 25C shows two attribute display screen, one for a destination attribute reference line a1, namely a meter, on the right, the other for an attribute reference line a2, namely a slider, and an attribute reference line a3, namely a meter source from the attribute reference line a1 of the meter, on the left;

DESCRIPTION OF THE PREFERRED EMBODIMENTS

Figure 1:
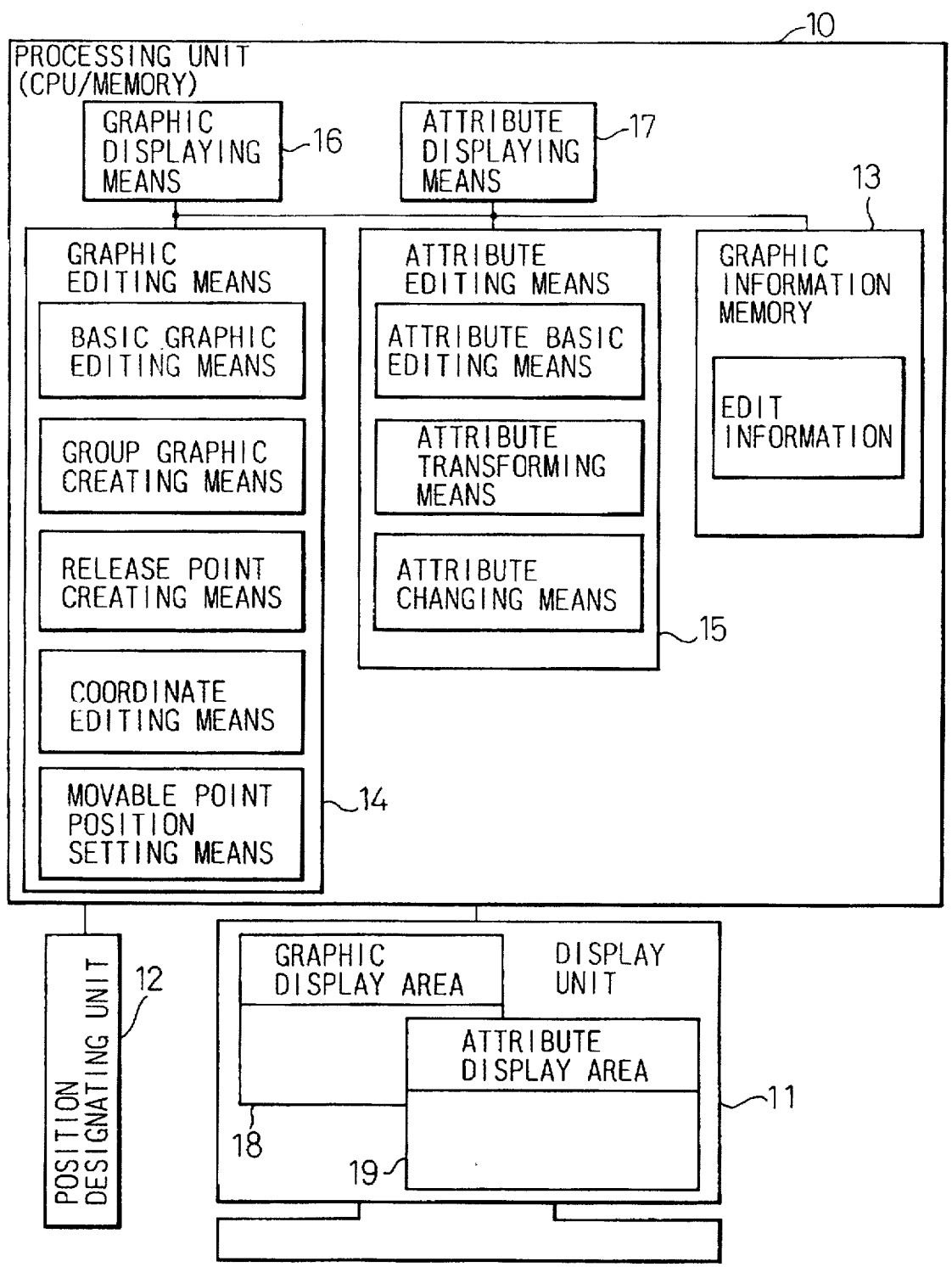
FIG. 1 is a view showing a basic constitution of a graphic editing apparatus of the present invention.

FIG. 1 is a view showing a basic constitution of a graphic editing apparatus of the present invention. A graphic editing apparatus includes a processing unit 10 consisting of a CPU, a memory, and the like for creating or editing graphics to be displayed on a screen, a display unit 11 for displaying the graphics being created or edited on the screen, and a position designating unit 12 for use in designating coordinate positions on the screen of the display unit 11 by means of a mouse, a light-pen, a keyboard or the like, and inputting the designated position data into the processing unit 10.

Two windows are assigned on the screen of the display unit 11. One window is assigned for a graphic display area 18 in which graphics or graphic reference lines are displayed. The other window is assigned for an attribute display area 19 in which attribute reference lines corresponding to the graphic reference lines displayed in the graphic display area 18, and representing attribute changes of graphics are displayed. The display unit may be provided with two physical screens in which a window is assigned to each screen.

The processing unit 10 includes a graphic information memory 13, a graphic editing mean 14, an attribute editing means 15, a graphic displaying means 16 and an attribute displaying means 17.

The graphic information memory 13 stores edit information necessary for editing graphics or attributes. The edit information includes a plurality of group management information for managing hierarchically structured graphics. A hierarchically structured graphic has a plurality of graphics and a plurality of group graphics. Each graphic information and each group graphic information is stored in another memory area of the graphic information memory 13.

In the present invention, a group graphic includes a plurality of graphics collected together and handled as a single graphic. A group graphic can include at least one group graphic. Further, a collection of graphics forming, a hierarchical structure, including a plurality of graphics and/ or a plurality of group graphics is called a hierarchically structured graphic. Assuming a main hierarchically structured graphic contains a plurality of classes, in which the upper-most class has a first group graphic and a lower class has a second group graphic, a collection of lower graphics including the second group graphic is called a sub-hierarchically structured graphic. Group management information of the main hierarchically structured graphic is called root information, while group management information of the sub-hierarchically structured graphic currently editing is called scope information.

The edit information includes root information, scope information and graphic/attribute information for a currently editing group graphic. In the graphic/attribute information, yes or no graphic header information for each graphic or each group graphic and yes or no attribute information corresponding to the graphic header information in the scope information, are stored in the group management information of the sub-hierarchically structured information. Furthermore, when at least one group graphic exists inside a group frame graphic surrounding the group graphic, address data for group management information of the group graphics is also stored in the graphic/attribute information.

The editing apparatus includes: a graphic editing means 14 for creating graphic reference lines in a graphic display area 18 on the screen, which are defined by transforming attribute changes resulting from movement, deformation, rotation, enlargement, color, or the like, concerning a first graphic in the first and a second graphics or in the first graphic and a first group graphic, or a first group graphic in the first and a second graphics or in the first graphic and the first group graphic, into changes of positions on the screen of the display unit 11;

a graphic displaying means 16 for displaying graphics or the graphic reference lines created by the graphic editing means 14 in the graphic display area 18;

an attribute editing means 15 for creating attribute reference lines in an attribute display area 19 on the screen which are defined by transforming the attribute changes corresponding to the graphic reference lines into changes of positions on the screen; and an attribute displaying means 17 for displaying the attribute reference lines created by the attribute editing means 15 in the attribute display area 19.

The graphic editing means 14 includes a basic graphic editing means, a group graphic creating means, a release point creating means, a coordinate editing means, and a movable point position determining means.

The basic graphic editing means executes fundamental processes of the graphic editing means 14, for example, creating or editing graphics such as a square and a circle on the screen.

The group graphic creating means executes the following steps.
Step 1: storing coordinate transformation information for the main hierarchically structured graphic in main group management information for managing the main hierarchically structured graphic, and coordinate transformation information for sub-hierarchically structured graphic in a sub-group management information for managing a sub-hierarchically structured graphic having a determined group graphic, in which the main hierarchically structured graphic includes the sub-hierarchically structured graphic as a lower class;
Step 2: transforming a coordinate of the sub-hierarchically structured graphic based on the coordinate transformation information stored in the sub-group management information by means of the coordinate editing means when editing the sub-hierarchically structured graphic;
Step 3: displaying the sub-hierarchically structured graphic in accordance with the transformed coordinate of the sub-hierarchically structured graphic; and
Step 4: editing the main hierarchically structured graphic by means of a basic graphic editing means.

The release point creating means executes the following steps.
Step 1: determining at least one point as a released point in determined graphics inside a grouped frame graphic surrounding a group graphic containing a plurality of graphics;
Step 2: storing information of the released point and the grouped frame graphic as grouped frame graphic information;
Step 3: storing information of graphics inside the group frame graphic except the determined graphic having the released point as stationary graphic information;
Step 4: displaying the graphics stored as the stationary graphic information without any change; and
Step 5: editing the group graphic to be displayed by means of a group graphic creating means such that only the determined graphic having the released point to be independently changed as a result of movement, deformation, rotation, enlargement, or the like, of the determined graphic.

The movable point position determining means for editing a plurality of graphics, executes the following steps.
Step 1: creating a graphic reference line having a first movable point graphic in a graphic display area 18 on the screen of the display unit 11, in which the graphic reference line is obtained by transforming changes of attributes as a result of movement, deformation, rotation, enlargement, color, or the like, of a determined graphic into changes of positions in the graphic display area 18;
Step 2: interpolating the positions of the first movable point graphic on the graphic reference line corresponding to changes of the attribute so as to obtain numerical data;

Step 3: moving positions of the first movable point graphic of the graphic reference line in accordance with the numerical data;

The attribute editing means 15 includes an attribute basic editing means, an attribute transforming means, and an attribute changing means.

The attribute basic editing means executes fundamental process of the attribute editing means 15, for example, creating or editing attribute reference lines on a screen.

The attribute editing means 15 includes an attribute changing means for editing a plurality of graphics, executes the following steps.

Step 1: creating an attribute reference line in an attribute display area 19 on the screen of the display unit 11, in which the attribute reference line is defined by transforming changes of the attribute corresponding to the graphic reference line into changes of positions on the screen;

Step 2: moving positions of a second movable point graphic on the attribute reference line in accordance with changes of positions of the first movable point graphic of the graphic reference line; and Step 3: calculating numerical data corresponding to changes of the attribute of the determined graphic from changes of positions of the second movable point graphic of the attribute reference line.

The attribute transforming means executes the following steps.

Step 1: selecting one of the attribute reference lines as a first attribute reference line;

Step 2: creating a second attribute reference line transformed from the first attribute reference line in the attribute display area 19 as an attribute reference line corresponding to the second graphic or the second group graphic;

Step 3: creating synchronous transmission information which includes address data for attribute information of the first attribute reference line corresponding to attribute information of the second attribute reference line and address data for attribute information of the second attribute reference line corresponding to attribute information of the first attribute reference line; and Step 4: editing graphics so that the attribute of the second graphic or the second group graphic may be changed in response to a change of the attribute of the first graphic or the first group graphic by an attribute transforming means.

The attribute changing means depending on movable point graphic positions, was previously explained.

A graphic displaying means 16 executes operations of displaying desired graphics in the graphic display area 18 on the screen of the display unit 11 and the desired graphics are retrieved from a plurality of graphic header information stored in the graphic information memory 13.

An attribute displaying means 17 executes operations of displaying desired attribute reference lines in the attribute display area 19 on the screen of the display unit 11, the desired attribute reference lines are retrieved from a plurality of attribute information stored in the graphic information memory 13.

Figure 2:
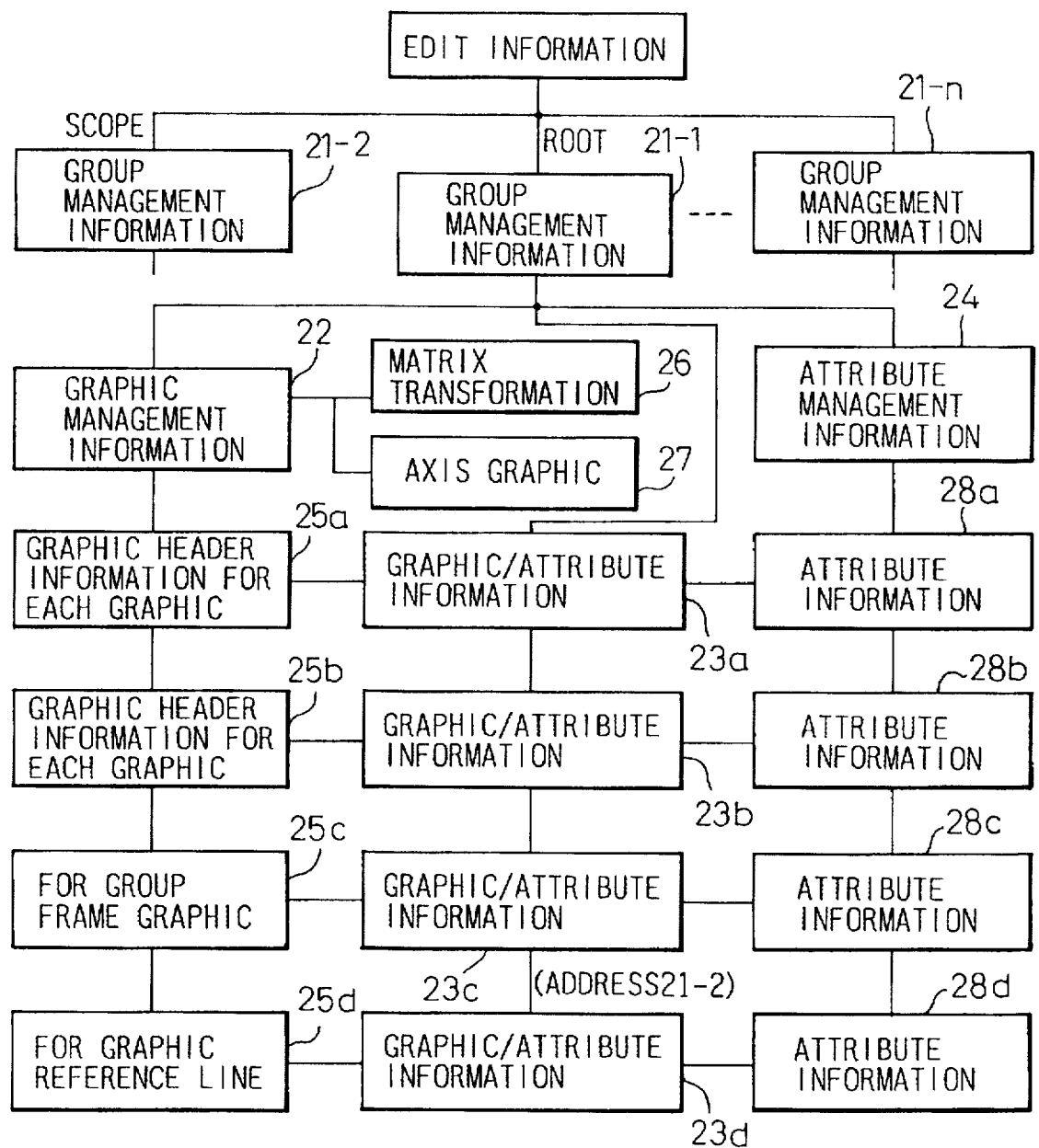
FIG. 2 is a view showing the general data structure of edit information.

FIG. 2 is a view showing the general data structure of edit information. The edit information stored in the graphical information memory 13 shown in FIG. 1 will be explained in detail hereinafter. The edit information includes a plurality of group management information 21-1, 21-2, . . . , 21-n.

As previously explained, the edit information is generally classified into three main information types such as the root information, the scope information and graphic/attribute information.

The root information is for managing a hierarchically structured graphic in hierarchical structure. The hierarchically structured graphic includes a plurality of graphics and/or a plurality of group graphics in hierarchical structure. The root information includes graphic management information 22, attribute management information 24 and graphic/attribute management information 23a to 23d. The graphic management information 22 is for managing a plurality of graphics and/or a plurality of group graphics forming a hierarchically structured graphic. The graphic management information 22 includes graphic header information 25a and 25b for each graphic that is constituent of the hierarchically structured graphic to be managed, graphic header information 25c for a group frame graphic surrounding a group graphic, and graphic header information 25d for a graphic reference line. The graphic management information 22 further includes matrix transformation information 26 for defining a coordinate axis of a total hierarchically structured graphic displayed on a screen by matrix representation, and axis graphic information 27 for displaying the coordinate axis of the hierarchically structured graphic as a graphic based on the matrix transformation information 26.

The matrix transformation information 26 is represented by 6 real numbers, for example, given by a matrix consisting of 3 lines and 2 columns. According to prior art, real coordinate can be obtained by using this matrix transformation information 26 thereby displaying graphics on a screen being vertically or horizontally enlarged or reduced, or being rotated or obliquely sheared.

The axis graphic information 27 is conveniently shown to operators to show the coordinate axis after simply transforming the coordinate of the hierarchically structured graphic, thereby the operators can visually recognize the transformed coordinate axis.

The graphic/attribute management information 23a to 23d include yes or no graphic header information 25a and 25b for each graphic constituent of the hierarchically structured graphic to be managed, yes or no graphic header information 25c for a group frame graphic surrounding a group graphic, and yes or no graphic header information 25d for a graphic reference line. The graphic/attribute management information 23a to 23d also include yes or no attribute information 28a to 29d. The graphic/attribute management information 23d, in this case, further includes address data 21-2 of group management information in which graphic information inside the group frame graphic is stored. There may be a lower class group graphic other than graphics inside the group frame graphic.

The attribute management information 24 are used for managing attribute information 28a to 28d. The attribute information 28a to 28d are information corresponding to attributes of graphic header information 25a to 25d. However, the attribute information 28a to 28d do not always exist corresponding to the graphic header information 25a to 25d, and vice versa.

The attribute information 28a to 28d include graphic header information, classified information, movable point graphic information, attribute information and pointer information to a process function upon renewal of the attribute value. Here, the classified information means information for distinguishing whether the attribute is source or destination of transformation or else. Information of movable point graphic include point information of the movable point graphic and address data of synchronous transmitting information. The pointer information to the process function upon renewal of attribute value means address data for the function program which is stored in the graphic information memory 13 and used as a function upon renewal of the attribute value. The synchronous transmitting information includes pointer address data of a graphic reference line for a desired graphic, pointer address data of the movable point graphic, pointer address data of the attribute reference line corresponding to the graphic reference line, and each data of pointer address of the movable point graphic section number and ratio data of each section of the movable point graphic. The information of each section number is indicated by the number of a section in which the movable point graphic exists. The ratio data is used for arithmetic of the position of the movable point graphic in a section on a graphic reference line or an attribute reference line.

The graphic header information includes information such as coordinate positions of a graphic displayed on the screen, the size of a graphic determined by width and height of the graphic, points, sections, and movable point graphics for the graphic. Hereinafter, the graphic header information will be explained in detail.

Figure 3A:
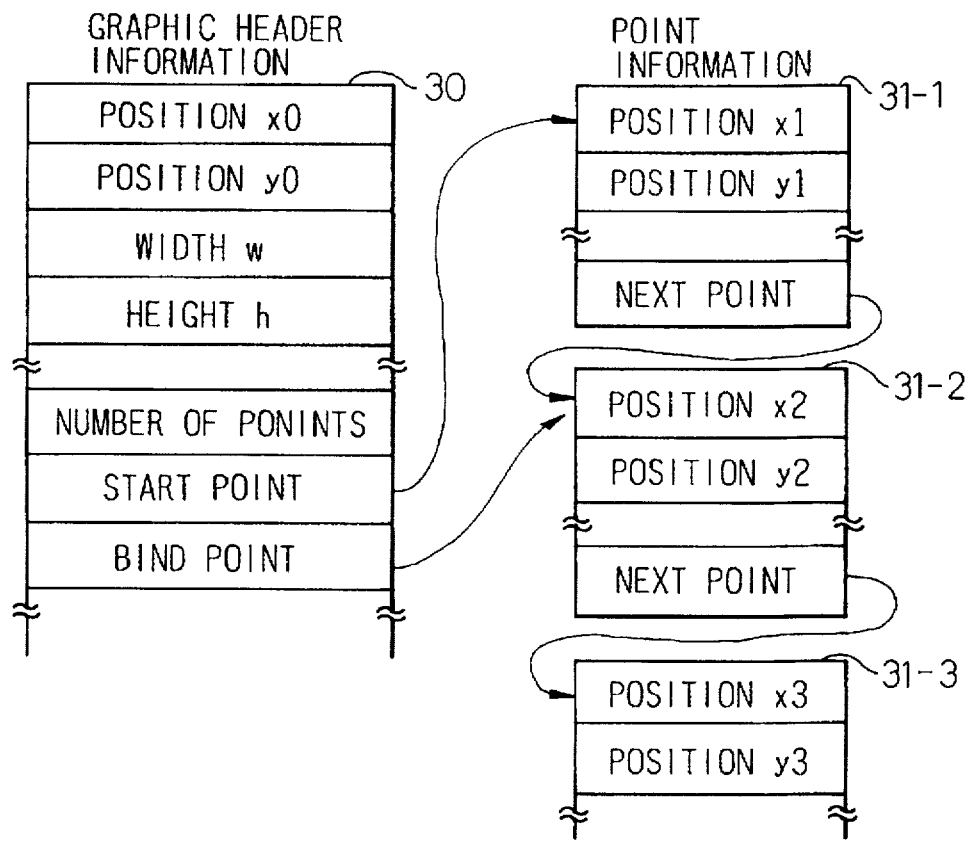
FIG. 3A is an explanatory drawing of graphic header information and point information for defining a shape of a graphic in prior art.
Figure 3B:
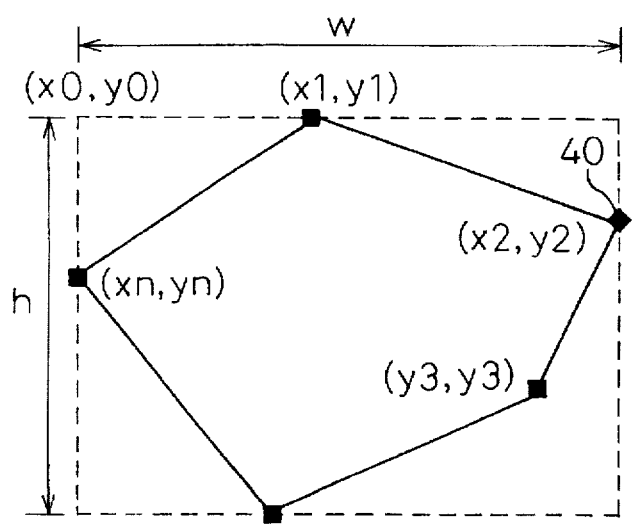
FIG. 3B is an explanatory drawing of an extent in prior art.
Figure 3C:
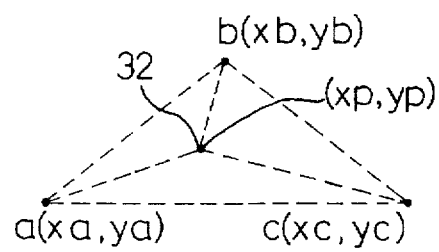
FIG. 3C is an explanatory drawing of degree of dependency on referenced points depending on three shape defining points in prior art.

FIG. 3A to 3C are explanatory drawings of graphic header information and point information. FIG. 3A is an explanatory drawing of graphic header information and point information for defining a shape of a graphic in prior art. FIG. 3B is an explanatory drawing of an extent in prior art.

FIG. 3C is an explanatory drawing of degrees of dependency on referenced points depending on three shape defining points in prior art.

As shown in FIG. 3A, graphic information is basically composed of graphic header information 30 and a set of points formation 31-1, 31-2, 31-3, etc, that define a shape of a graphic. The graphic header 30 consists of information concerning a rectangular zone occupied by a graphic (which is referred to as an extent), the number of points for defining the shape of the graphic, and a pointer pointing to an address of point information 31 concerning a start point 31-1. The graphic header 30 further includes a pointer pointing to an address of point information concerning a point defined as the bind point 31-2.

When a graphic is a polygon as shown in FIG. 3B, the extent is a rectangular zone indicated with a broken line. Extent information included in the graphic header 30 includes the coordinate (x0, y0) of a point at the left upper corner of the extent, the width w of the extent, and the height h thereof. Points information 31 includes coordinates of the vertices of the polygon; (x1,y1), (x2,y2), etc., and a pointer pointing to point information concerning the next point. The graphic header 30 and point information 31-1, 31-2, 31-3, etc, may include various other attributes if necessary. In an example shown in FIG. 3A and FIG. 3B, the point (x2,y2) specified in point information 31-2 is defined as the bind point 40. The bind point 40 is regarded as one of attributes specified in graphic information and helps to assure deformation during editing graphics.

Assume that, as shown in FIG. 3C, the position of the referenced point 32 is dependent on three shape determination points a, b and c, pointers pointing to the point information concerning the three points, and degree of dependency on the points; ka, kb and kc are specified in the referenced point information. Assume that the coordinates of the points a, b and c are indicated as (xa,ya), (xb,yb), and (xc,yc), and the coordinates of referenced point 32 is indicated as (xp,yp). The degree of dependency on the three points; ka, kb and kc are given by the following equations:

$ka \cdot xa + kb \cdot xb + kc \cdot xc = xp$ $ka \cdot ya + kb \cdot yb + kc \cdot yc = yp$ $ka + kb + kc = 1$ The point information further includes real coordinate information, virtual coordinate information and numerical data. The real coordinate information is point information (Rx, Ry) based on a real coordinate. The virtual coordinate information is point information (Vx, Vy) based on an virtual coordinate. The numerical data is information showing kinds of release. Here, the kinds of release means kinds of changes resulting from movement, deformation, rotation, enlargement, etc. of graphics.

The section information means information concerning two adjacent points defining a shape of a graphic. The section information includes address information of the adjacent two points consisting of a start point and an end point, and numerical data that indicates whether the line drawn between the two points is direct line, curved line or a circle arc.

The movable point graphic information includes point information for defining a shape of a movable point graphic and address information of synchronous transmission information.

The group frame graphic information includes graphic header information concerning a group frame graphic surrounding graphics constituent of a group graphic with a rectangular frame. The group frame graphic information also includes released point information that lists released points on the graphics inside the frame of the group frame graphic, and address information of graphics inside the frame of the group frame graphic.

The released point information includes address information of released points of graphics constituent of the group graphic, and address information of the released points managed by the group frame graphic information. Hereinafter, editing information will be explained with examples in detail.

Figure 4:
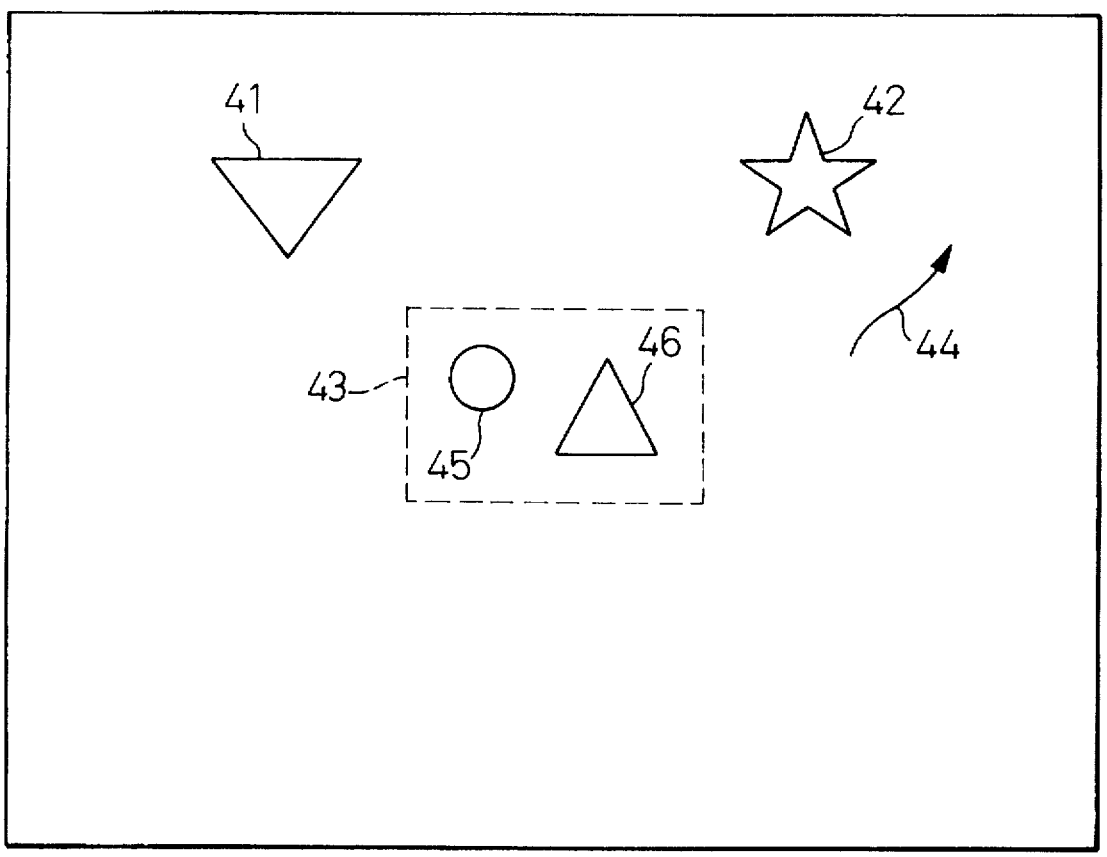
FIG. 4 is a view showing an example of a hierarchically structured graphic according to an embodiment of the present invention.

FIG. 4 is a view showing an example of a hierarchically structured graphic according to an embodiment of the present invention. As shown in FIG. 4, this hierarchically structured graphic includes a triangle 41, a star 42, a group frame graphic 43 and a graphic reference line 44. A circle 45 and a triangle 46 are surrounded by a frame of the group frame graphic 43. Where these graphic information are stored as edit information will be explained below referring to FIG. 2. Graphic information of the inverse triangle 41 and the star 42 are stored as graphic header information 25a and 25b. Graphic information of the group frame graphic 43 is stored as group frame graphic information 25c. In the graphic/attribute management information 23c corresponding to the group frame graphic information 25c, address 21-2 of group management information of the group frame graphic 43 is stored. Therefore, information of the circle 44 and the triangle 45 are stored as graphic header information included in group management information at the address of 21-2.

An editing method for editing only graphics inside a group frame graphic of a group graphic, namely a group graphic, in a hierarchically structured graphic will be explained below.

Figure 5A:
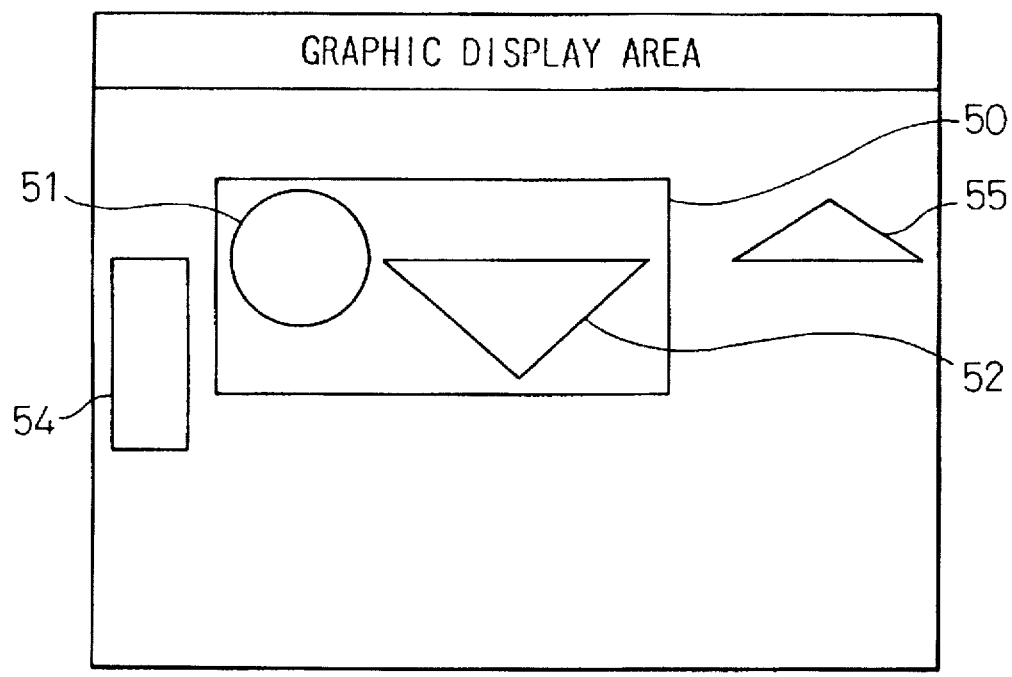
FIG. 5A is an explanatory drawing of a group graphic before the focus-in according to an embodiment of the present invention.
Figure 5B:
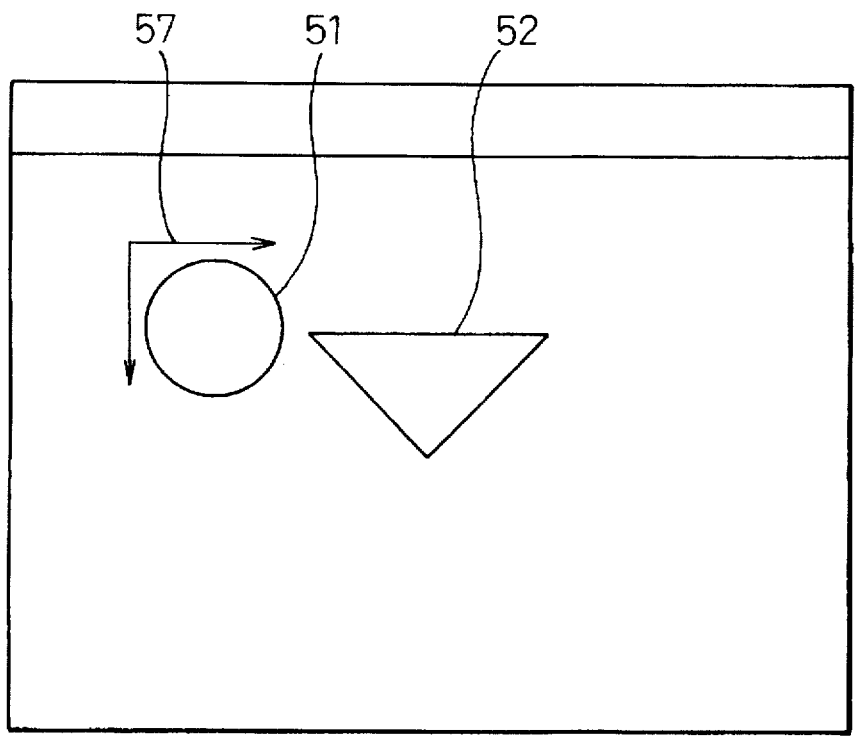
FIG. 5B is an explanatory drawing of a group graphic after the focus-in according to an embodiment of the present invention.

FIGS. 5A and 5B are explanatory drawings of focus-in and focus-out according to an embodiment of the present invention. FIG. 5A is a view showing an example of a group graphic before focus-in according to the present invention. FIG. 5B is a view showing an example of a group graphic after focus-in according to the present invention. FIG. 5A shows a group graphic consisting of a circle 51 and a triangle 52, a group frame graphic 50 surrounding the group graphic by a rectangle, a rectangle 54 and a triangle 55, created in a graphic display area on a screen. The focus-in is an operation to define editing area inside the group frame graphic. The focus-out is an operation to reset an operation of the focus-in, namely the focus-out releases the editing area back to the normal. When focus-in is operated to define editing area inside the frame of the group frame graphic 50, graphics of the group frame graphic 50, the rectangle 54 and the triangle 55 disappear from the screen, and the circle 51 and the inverse triangle 52 are remained on the screen as shown in FIG. 5B. Further, a coordinate axis graphic 57 of the group graphic appears on the screen. After this, graphics inside the group frame graphic 50 can be edited without causing any influences to the graphics outside the group frame graphic 50. This method is very effective particularly when a coordinate transformation of the graphics only inside the group frame graphic 50 is required. When the focus-out control is operated, the display of the screen returns from FIG. 5B to FIG. 5A, and editing operation of the whole graphics on the screen become possible. This is because the focus-in is controlled to allow operators to access only desired graphic management information in the editing information.

Figure 6:
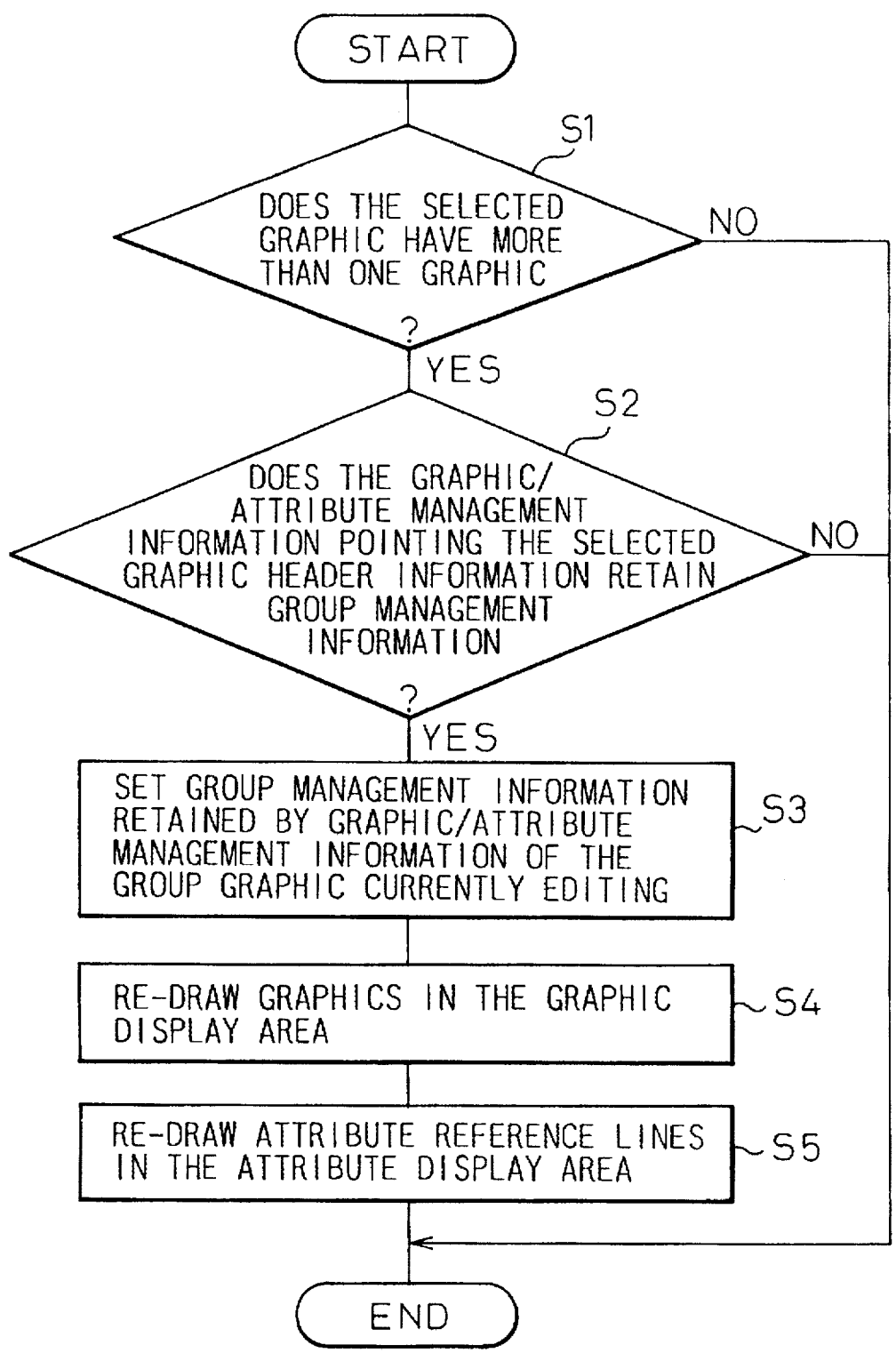
FIG. 6 is a flow chart of the focus-in process according to the present invention.

FIG. 6 is a flow chart of the focus-in process according to the present invention. Numbers following after the letter "s", described in accompanied figures, from FIG. 6 to FIG. 24, indicate step numbers.

First, Focus-in is selected from menu shown upper part on the screen of the display unit 11 and the focus-in operation, by the position designating unit 12 starts, then the cpu in the processing unit 10 distinguishes whether the selected graphic consists of only one graphic or more (Step S1). When the result of the step S1 is yes, it is distinguished whether or not the graphic/attribute management information relating to the selected graphic header information retains group management information (Step S2). When the result of the step S1 is no, the focus-in process is finished. When the result of the step S2 is yes, the group management information retained by graphic/attribute management information of the group graphic currently editing in edit information is set (Step S3). Here, setting group management information means replacing the scope information. When the result of the step S2 is no, the focus-in process is finished. After the execution of the step S3 is finished, graphics in the graphic display area 18 are re-drawn (Step S4), and the attribute reference lines in the attribute display area 19 are re-drawn (Step S5).

Figure 7:
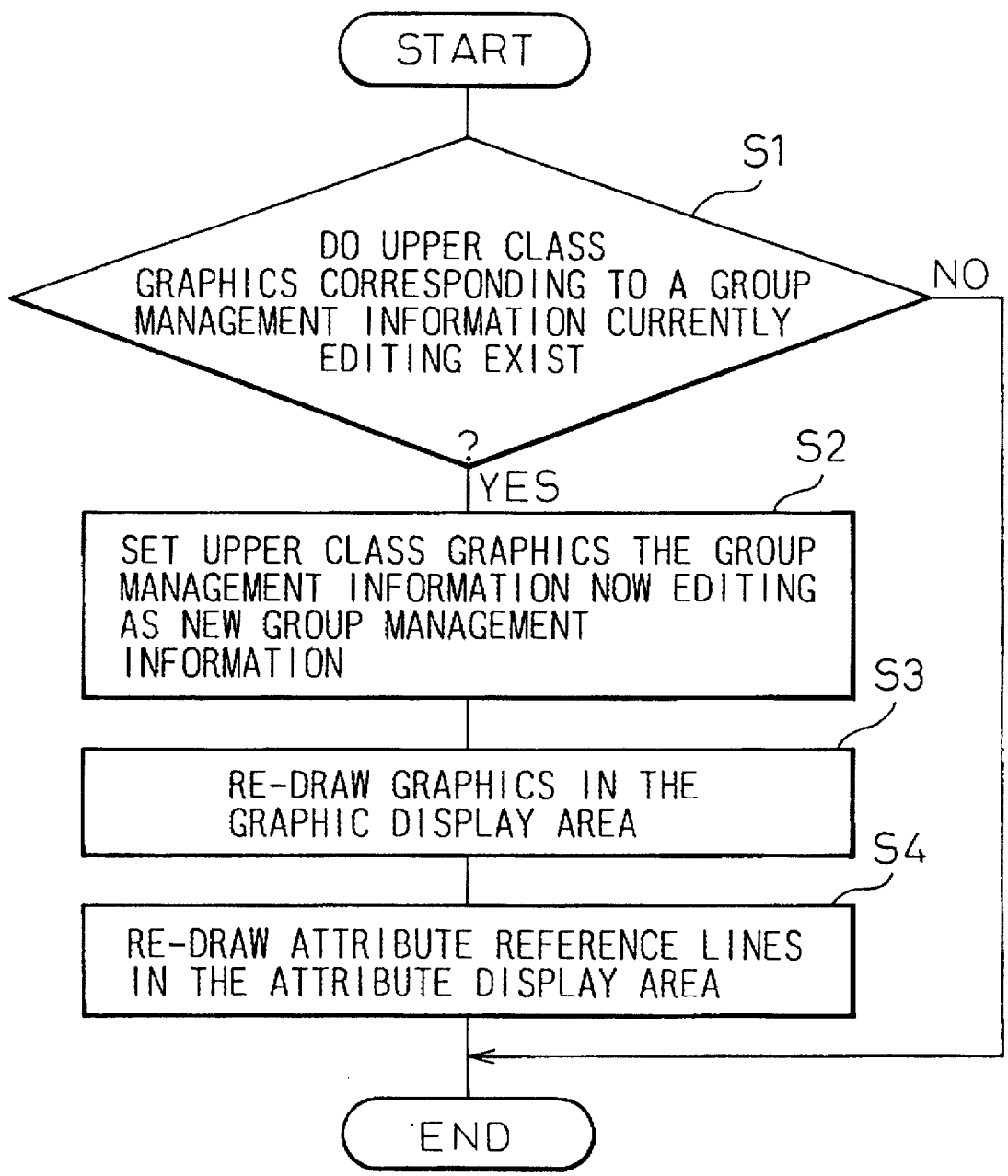
FIG. 7 is a flow chart of the focus-out process according to the present invention.

FIG. 7 is a flow chart of the focus-out process according to the present invention. First, it is distinguished whether or not upper class graphics or upper class group graphics corresponding to a group management information currently editing in edit information exist (Step S1). When the result of the step S1 is yes, the group management information of the upper class graphics or the group graphics in edit information as new group management information is set (Step S2). When the result of the step S1 is no, the focus-out process is finished. After the execution of the step S2 is finished, graphics in the graphic display area 18 is re-drawn (Step S3), and re-drawn attribute reference lines in the attribute display area 19 is re-drawn (Step S4).

Figure 8A:
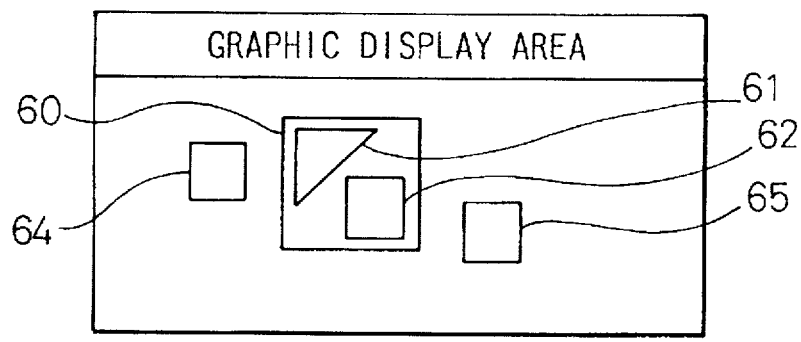
FIG. 8A is a view showing a display on a screen in the graphic display area in which a group graphic, a group frame graphic and other graphics are displayed.
Figure 8B:
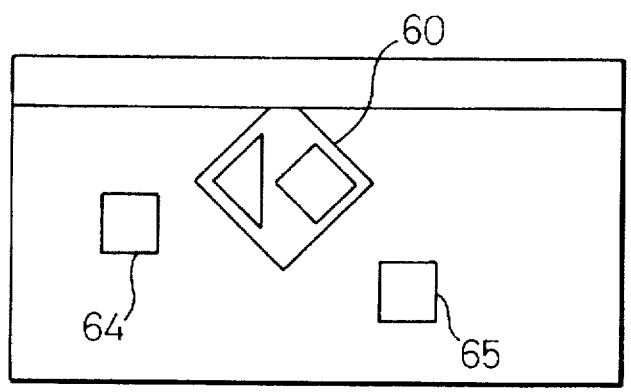
FIG. 8B is a view showing a display of a group graphic rotated by the angle of 45°.
Figure 8C:
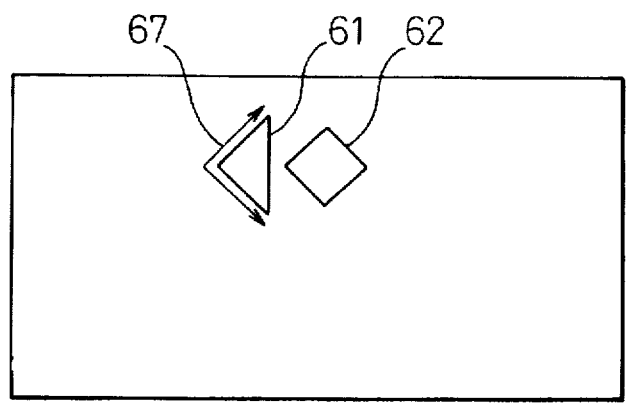
FIG. 8C is a view showing a display of the group graphic shown in FIG. 8B after focus-in for editing the group graphic.

FIG. 8A, FIG. 8B and FIG. 8C are sample drawings of a set of displays on a screen showing that focus-in operation is executed after a group graphic is rotated by 45°. FIG. 8A is a view showing a display on a screen in the graphic display area in which a group graphic consisting of a triangle 61 and a square 62, a group frame graphic 60 of the group graphic and two rectangles 64 and 65 are displayed. FIG. 8B is a view showing a display of a group graphic surrounded by a group frame graphic 60 rotated by the angle of 45°, and FIG. 8C is a view showing a display of the group graphic shown in FIG. 8B after focus-in for editing the group graphic. As can be seen in FIG. 8C, compared with FIG. 8B, the group frame graphic 60 and two rectangles 64 and 65 disappear and the inverse triangle 61 and the square 62 only remain on the screen. Furthermore, an axis graphic 67 that indicates the coordinate axis of the group graphic rotated by 45° is displayed. As shown in FIG. 8B and FIG. 8C, it can be understood that the axis graphic 67 indicating the coordinate axis of the group graphic is displayed as if it is rotated in the same angle of the rotation as that of the group graphic.

Figure 9:
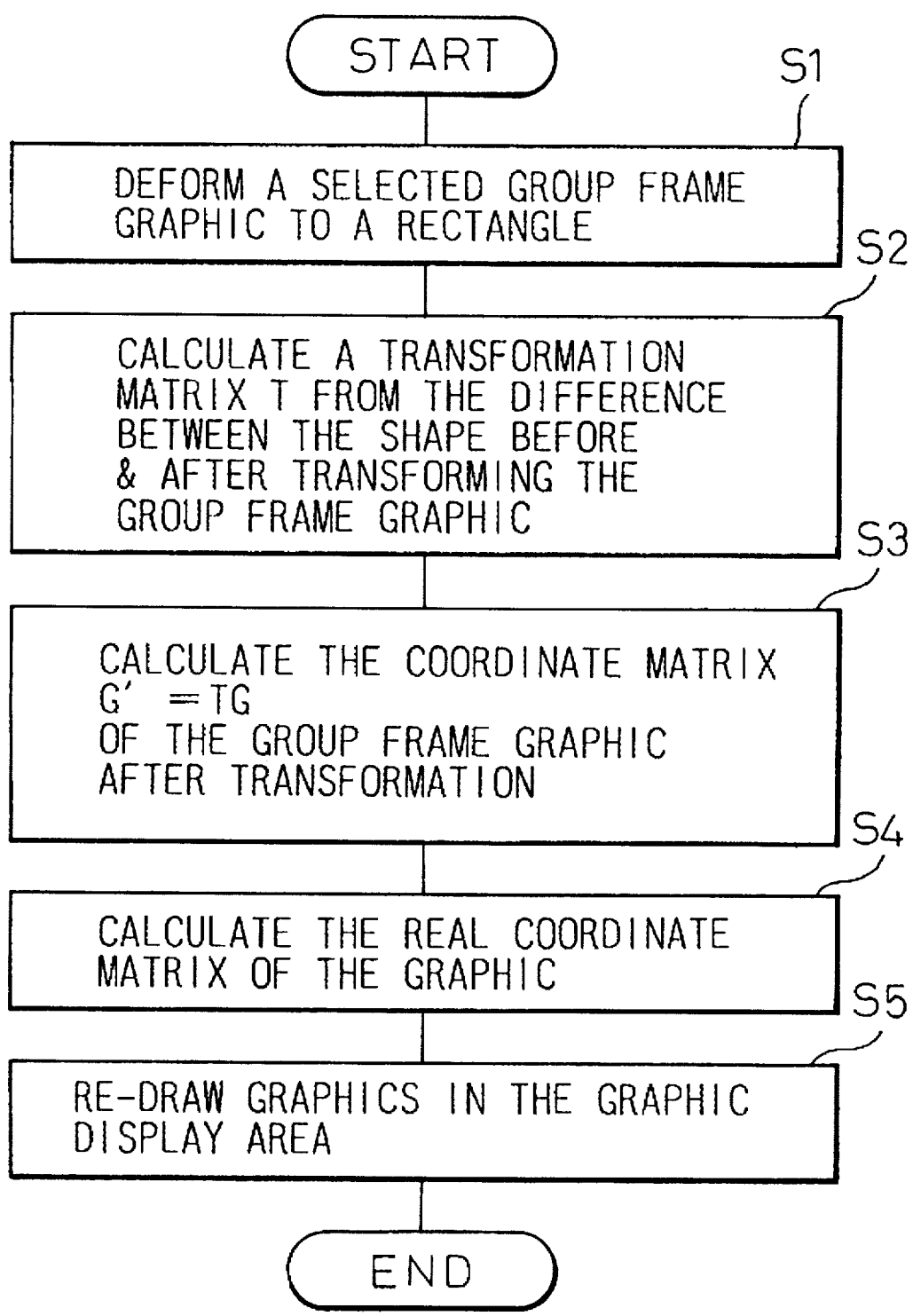
FIG. 9 is a flow chart of a process of transforming the coordinates of a group graphic by rotating the group graphic.

FIG. 9 is a flow chart of a process of transforming the coordinates of a group graphic by rotating the group graphic. A cpu in the processing unit 10 executes the deformation of a selected group frame graphic to a rectangle (Step S1), and calculates a transformation matrix T from the difference between the shape of before and after transforming the group frame graphic (Step S2). The coordinate matrix G'=T×G (T and G will be explained later) of the group frame graphic after transformation is calculated (Step S3). The real coordinate matrix of the graphic is calculated (Step S4). The graphics in the graphic display area 18 are re-drawn (Step S5).

Hereinafter, a real coordinate and a virtual coordinate will be briefly explained. The reason why the real coordinate and the virtual coordinate are used in the present invention is that coordinate transformation can be effectively processed by the use of at least one real coordinate and virtual coordinate. Here, a real coordinate means the x-y coordinate representing each dot (pixel) position on a window screen based on an original point at a left upper corner of the window screen. Each dot position on the screen is expressed as (Rx, Ry). The virtual coordinate (Vx, Vy) is a determined coordinate provided for giving the real coordinate obtained as a result of rotation or movement of the determined coordinate, in which the real coordinate can be given by multiplying the determined coordinate by a transformation matrix. The virtual coordinate (Vx, Vy) corresponding to the real coordinate (Rx, Ry) is expressed by the following equation.

$$(Rx, Ry) = T \times (Vx, Vy)$$

wherein T is (2, 3) transformation matrix having 2 rows and 3 columns, which generally provides arbitrary two dimensional coordinate. Assuming that each transformation matrix of each hierarchically structured group graphic as G0, G1, . . . , Gn respectively, total transformation matrix T can be given by the equation below.

$$T = G0 \times G1 \times \ldots \times Gn$$

FIG. 10 is a flow chart of a process of transforming a coordinate axis of a group graphic by rotating the group graphic. Real coordinates for all of the graphic header information stored in graphic management information are calculated (Step S1). Whether or not the transformed graphic header information is for a group frame graphic is determined (Step S2). If it is distinguished yes in step S2, real coordinates of the group graphic of the group frame graphic are calculated (Step S3). If it is distinguished no in step S2, the process finishes.

Figure 11A:
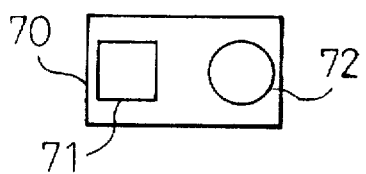
FIG. 11A shows a group frame graphic 70 of a group graphic consisting of a rectangle 71 and a circle 72.
Figure 11B:
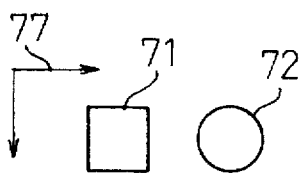
FIG. 11B shows graphics surrounded by the group frame graphic 70 during focus-in operation.
Figure 11C:
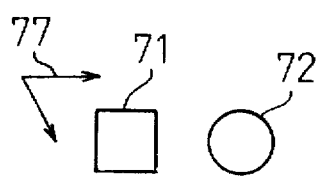
FIG. 11C shows the transformed coordinate axis graphic of the group graphic.
Figure 11D:
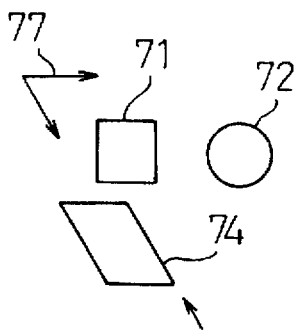
FIG. 11D shows a distorted rectangle 74 in a real coordinate system which is transformed from an orthogonal rectangular in a virtual coordinate system by transforming the coordinate axis of the group graphic.
Figure 11E:
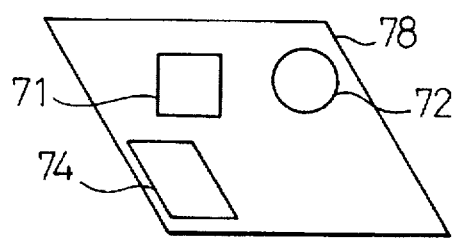
FIG. 11E shows a group graphic after focus-out.
Figure 11F:
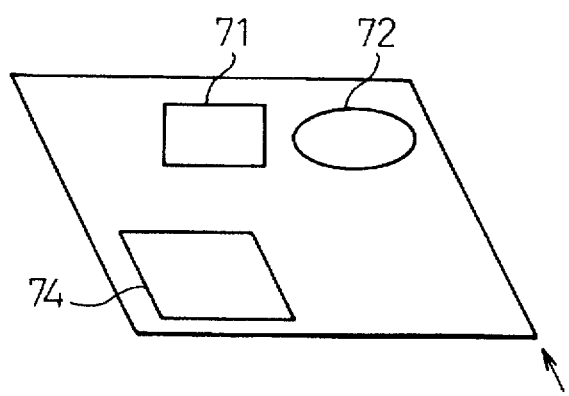
FIG. 11F shows an enlarged graphic from the graphic shown in FIG. 11E in the direction of X axis after focus-out.

FIG. 11A to FIG. 11F are views showing sample operations for creating graphics when transforming coordinate of a group graphic during focus-in operation. FIG. 11A shows a group frame graphic 70 of a group graphic consisting of a rectangle 71 and a circle 72. FIG. 11B shows graphics surrounded by the group frame graphic 70 during focus-in operation. FIG. 11C shows the transformed coordinate axis graphic of the group graphic. FIG. 11D shows a distorted rectangle 74 in a real coordinate system which is transformed from an orthogonal rectangle in a virtual coordinate system by transforming the coordinate axis of the group graphic. FIG. 11E shows a group graphic after focus-out. FIG. 11F shows an enlarged graphic from the graphic shown in FIG. 11E in the direction of X axis after focus-out. As shown in FIG. 11F, the shapes of graphics belonging to the group graphic are transformed based on the transformed coordinate after sequential operations such as the group graphic focus-in operation (step 1), the transformation of a coordinate of the group graphic (step 2), and the group graphic focus-out operation are executed (step 3).

Figure 12:
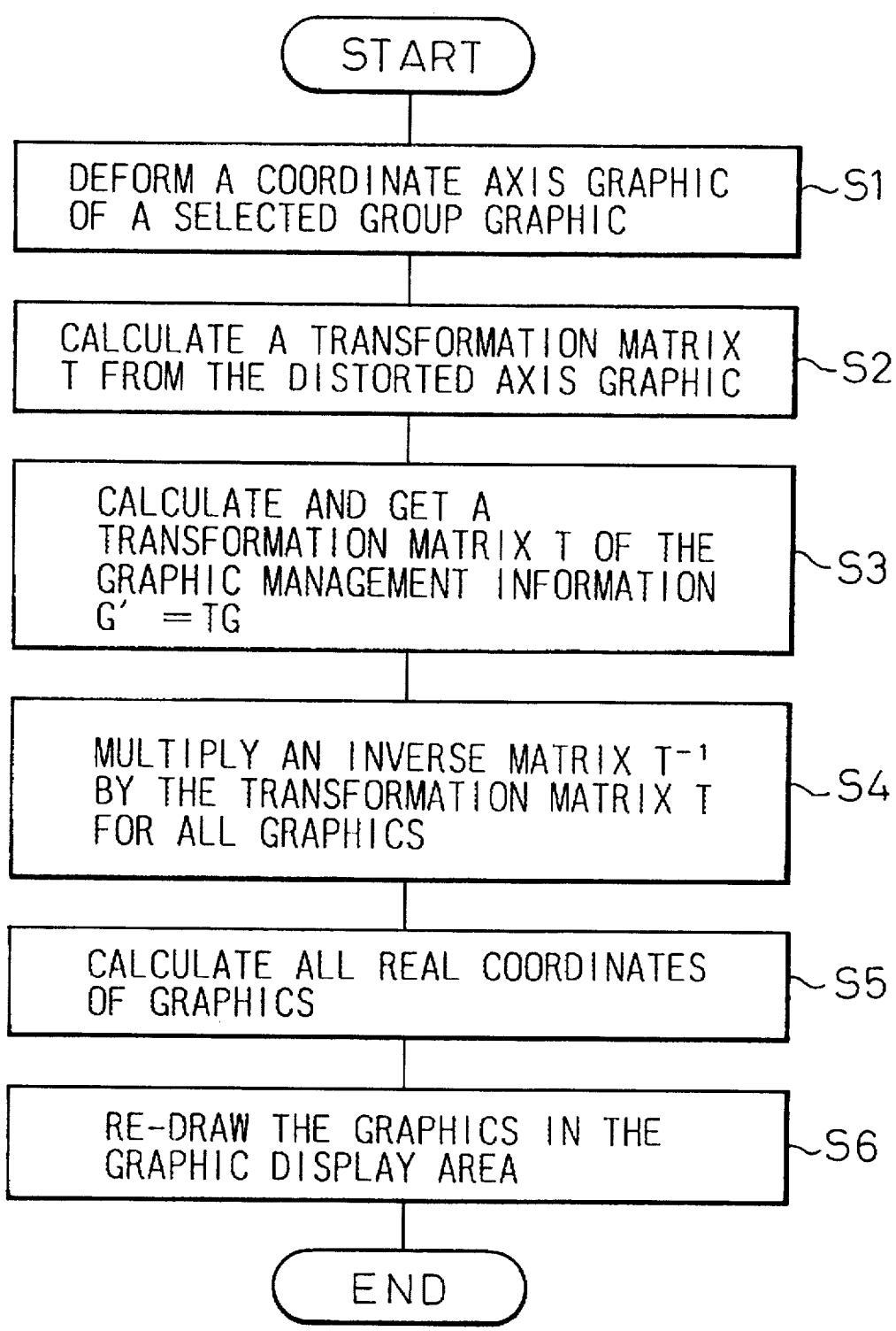
FIG. 12 is a flow chart of a process for a coordinate transformation during focus-in to a group graphic.

FIG. 12 is a flow chart of a process for a coordinate transformation during focus-in to a group graphic. The cpu of the processing unit 10 deforms a coordinate axis graphic of a selected group graphic (Step S1). An arithmetic of coordinate transformation is executed to obtain a transformation matrix T from the distorted axis graphic (Step S2). A calculation (G'=T G) of coordinate transformation is executed to obtain a transformation matrix T of the graphic management information that is stored in the group management information currently editing is calculated (Step S3). Calculations to multiply an inverse matrix $T^{-1}$ by the transformation matrix T for all graphics managed by the graphic management information are executed (Step S4). Calculations to obtain all real coordinates of graphics managed by the graphic management information are executed (Step S5). The graphics in the graphic display area 18 on the screen are re-drawn (Step S6).

A group graphic created to have a hierarchical structure can have a real coordinate given by multiplication of each transformation matrix of group graphic. In this case, assuming the transformation coordinate of top class group graphic is G0 and the transformation coordinate of n-th class group graphic is Gn, then the real coordinate R of the group graphic having classes can be given the following equation.

$$[Rx, Ry] = G0 \times G1 \times \ldots \times Gn \times [Vx, Vy]$$

FIG. 13 is an explanatory drawing of a released point. As shown in FIG. 13, inside a group frame graphic 80, there are a zigzag line 81 and a triangle 82 which form a group graphic. As previously explained, a group frame graphic information includes release destination point information. One of release destination point information is a release destination point information HP2 on graphics inside the group frame graphic 80. A plurality of release destination points can be set in the graphics inside the group frame graphic 80. The other release point information is a release source point information HP1 corresponding to the release destination point information HP2. The number of the release source point information HP1 is same as that of the release destination point information HP2. Between each release source point HP1 and each corresponding release destination point HP2, each corresponding virtual release point RP is interposed. The release source point HP1 can be correlated with the virtual release point RP in the same manner as the release destination point HP2 can be correlated with the virtual released point RP. Then, the change of the zigzag line 81 occurs in accordance with a kind of release previously selected from transformation, rotation, enlargement, or mode dependency by the basic graphic editing means in response to movement or deformation, or the like, initiated by a circle 83 related to the release destination point HP2. The virtual release point RP stores information of kind of release for both the release source point HP1 and the release destination point HP2. The same applies to a graphic correlated with the release source point HP1.

Figure 14:
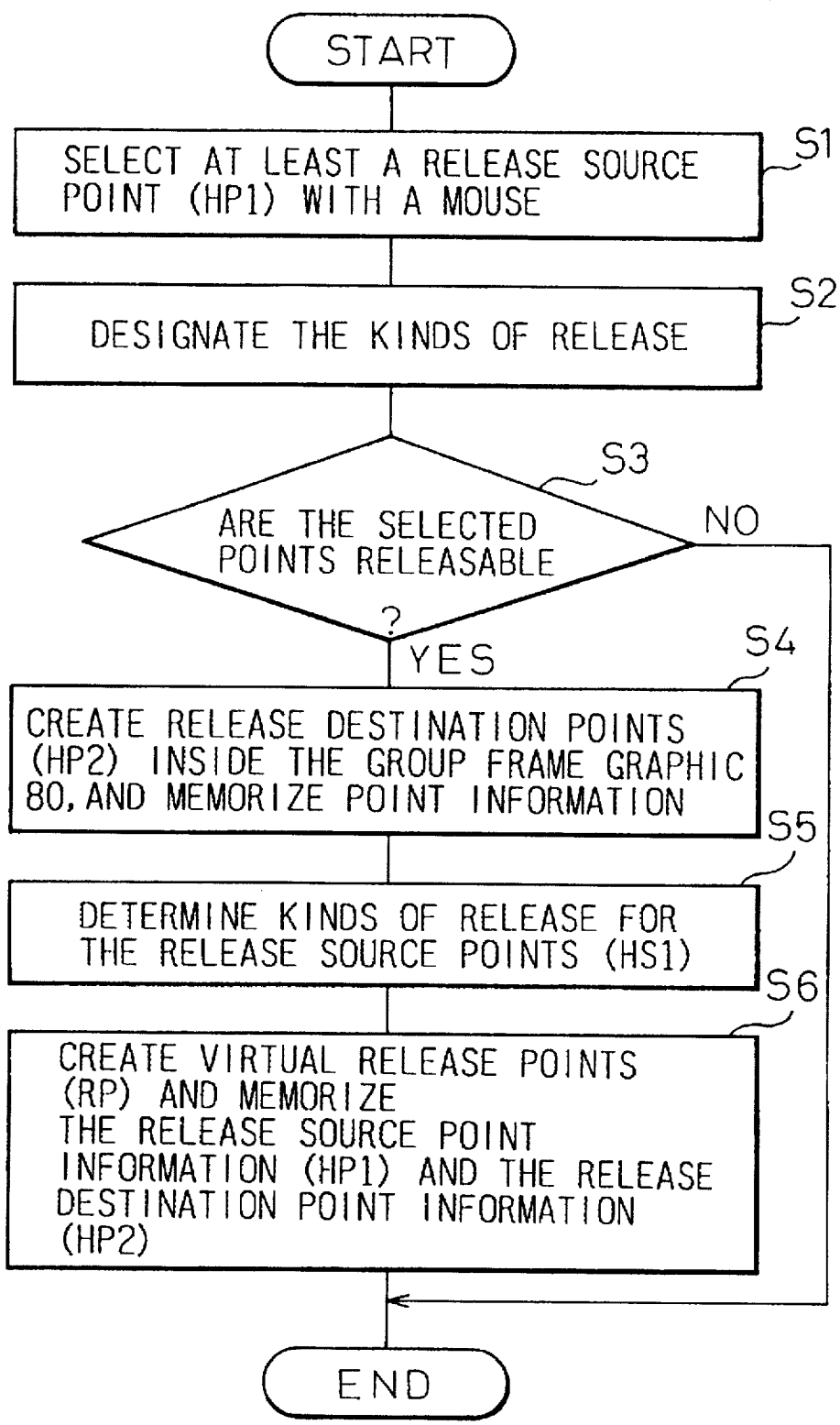
FIG. 14 is a flow chart of a process for creating a released point.

FIG. 14 is a flow chart of a process for creating a released point. At least a release source point HP1 is selected by entering with a mouse are designated (Step S1). The kinds of release from transformation, rotation, enlargement, or mode dependency (Step S2). Whether or not the selected points are releasable points based on whether or not the release source points HP1 are on shape defining points of graphics inside the group frame graphic is distinguished (Step S3). When the result of the step S3 is yes, release destination points HP2 inside the group frame graphic 80 are created, and point information are memorized (Step S4). Kinds of release for point information of the release source points HP1 are determined (Step S5). Virtual release points RP for interchanging information between the release source point information HP1 and the release destination point information HP2 are created, and the release source point information HP1 and the release destination point information HP2 are memorized (Step S6).

Figure 15:
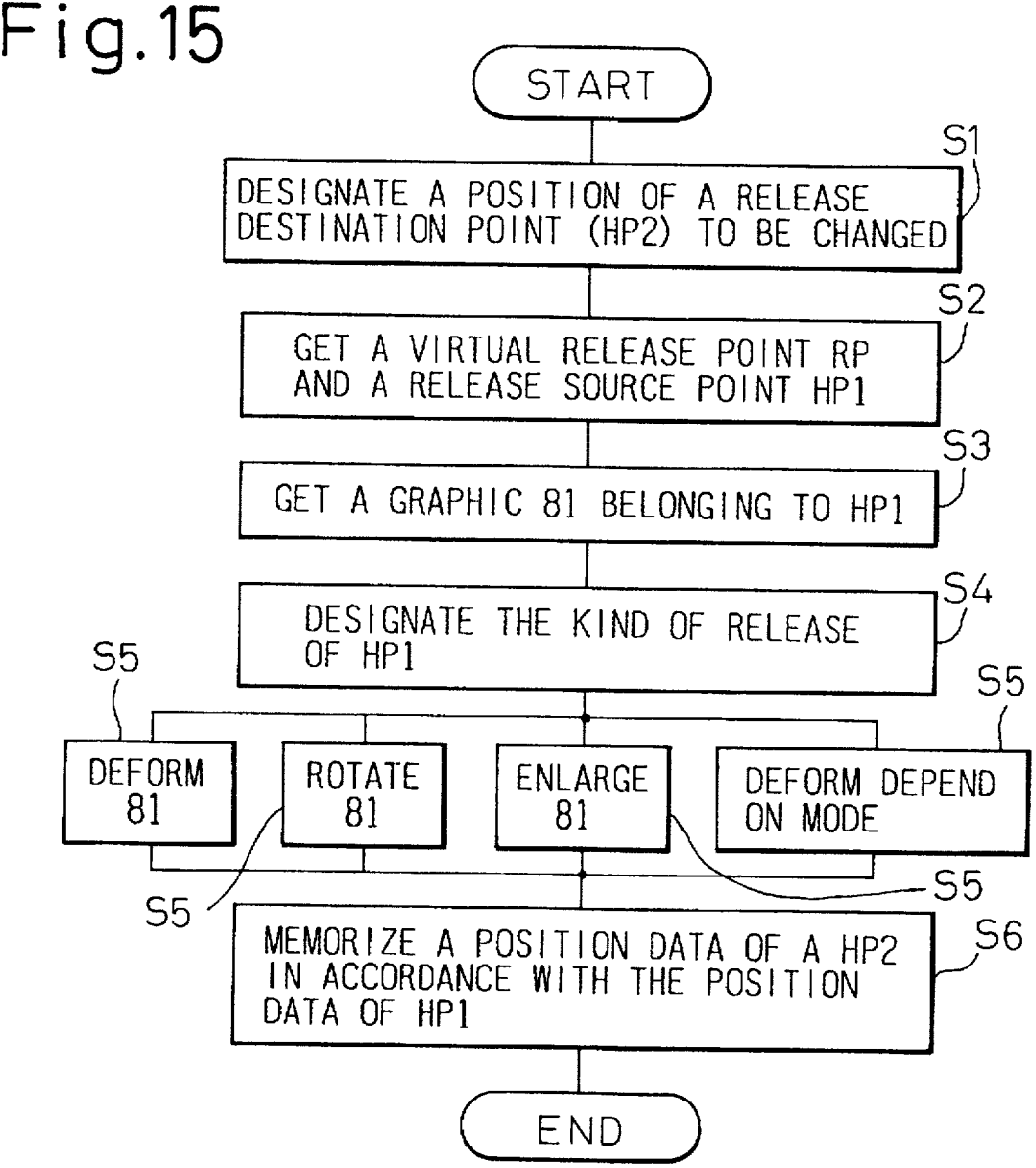
FIG. 15 is a flow chart of a process for operating a release point.

FIG. 15 is a flow chart of a process for operating a release point. A position of a release destination point HP2 is going to be changed via a mouse input device is designated (Step S1). A vertual release point RP and a release source point HP1 corresponding to the release destination point HP2 are obtained (Step S2). A graphic 81 belong to the release source point HP1 is obtained (Step S3). The kind of release of the release source point HP1 is designated by means of a mouse input device (Step S4). The kind of release includes deformation, rotation, enlargement, and mode dependency. Mode dependency is predetermined by a basic graphic editing means and functions to perform automatic editing in accordance with the preselected mode. Deformation, rotation, enlargement, or deformation corresponding to a dependent mode for a graphic 81 is executed (Step S5). A position data of a release destination point HP2 in accordance with the position data of the release source point HP1 is memorized after the execution of the step S5 (Step S6).

Figure 16:
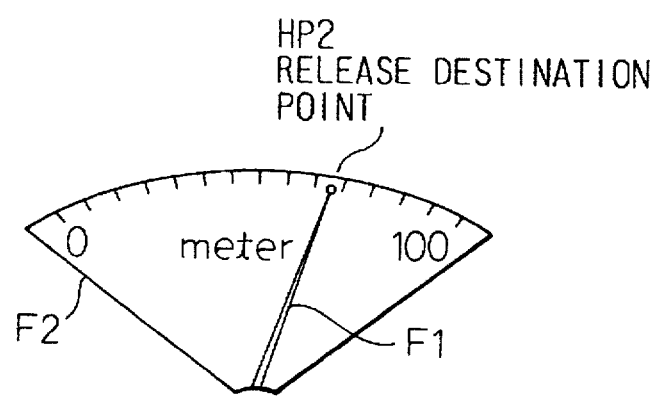
FIG. 16 is a view showing an example of a graphic editing method in use of a release point.

FIG. 16 is a view showing an example of a graphic editing method in use of a release point. A meter consisting of a pointer F1 and a scale plate F2 is shown in FIG. 16. The position of the pointer F1 on the scale plate F2 can be changed by setting the head of the pointer F1 as a release destination point HP2. In this way, a graphic forming a meter can be edited as if it were one of parts by using the graphic information thereof. Furthermore, a pointer F1, an element of the group graphic, namely an element of the meter, can be edited without changing other graphics composing the group graphic than the pointer by only releasing a point of the pointer F1.

Figure 17A:
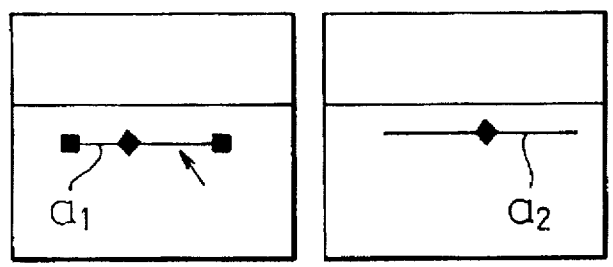
FIG. 17A shows an attribute reference line a1 on the left screen and an attribute reference line a2 on the right screen, and indicates a step when the attribute reference line a1 is about to be selected.
Figure 17B:
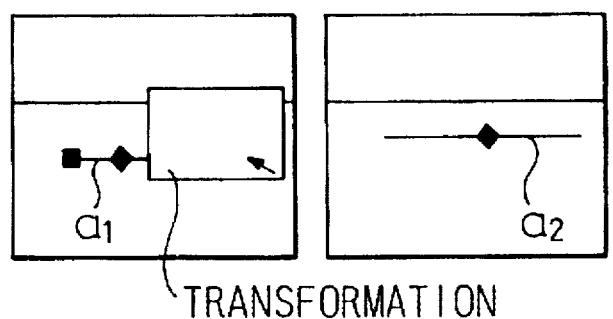
FIG. 17B indicates the step to initiate the transformation of the attribute reference line a1.
Figure 17C:
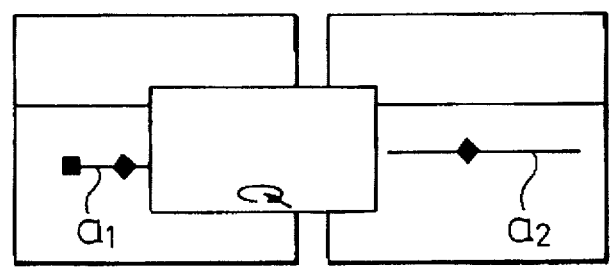
FIG. 17C indicates when the name of the attribute process of the transformation is entered.
Figure 17D:
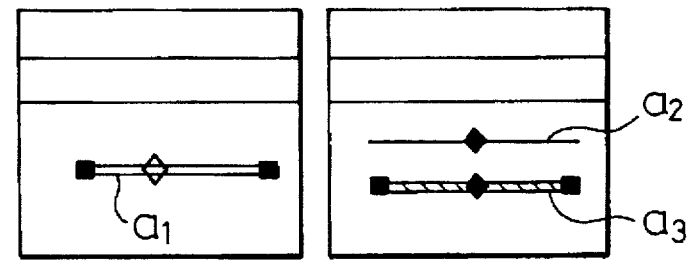
FIG. 17D indicates that a destination attribute reference line a3 is created on the right screen and an appearance of the source attribute reference line a1 is changed on the left screen.
Figure 17E:
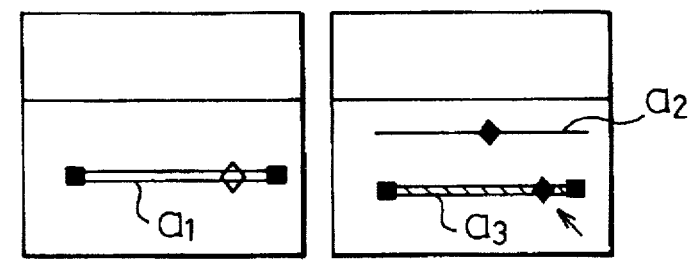
FIG. 17E indicates that an attribute value of the source attribute reference line a1 is changed as a result of the change of the destination attribute reference line a3.

FIG. 17A to FIG. 17E are explanatory drawings of an operational procedure for transformation. Each figure indicates two screens for attribute processes. FIG. 17A shows a transformation source attribute reference line a1 for attribute information on the left screen and an attribute reference line a2 for attribute information on the right screen, and indicates a step when the transformation source attribute reference line a1 for an attribute information is about to be selected. FIG. 17B indicates the step to initiate the transformation of the source attribute reference line a1 for an attribute information. FIG. 17C indicates when the name of the attribute process of the transformation is entered. FIG. 17D indicates that a transformation destination attribute reference line a3 for an attribute information is created on the right screen and an appearance of the transformation source attribute reference line a1 for an attribute information is changed on the left screen. FIG. 17E indicates that an attribute value of the transformation source attribute reference line a1 is changed as a result of the change of the transformation destination attribute reference line a3 for an attribute information.

Figure 18A:
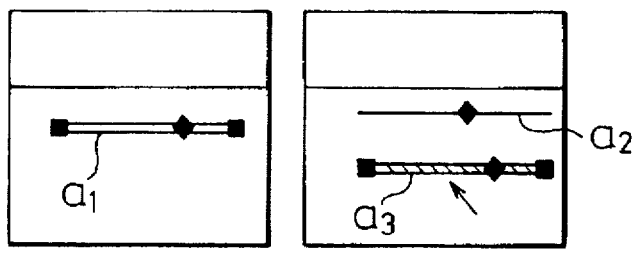
FIG. 18A indicates a step when the destination attribute reference line a3 is about to be selected on the right screen, and as a result the appearance of the source attribute reference line a1 is changed on the left screen.
Figure 18B:
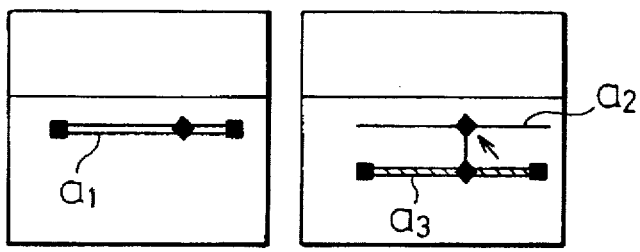
FIG. 18B indicates a step when a movable point of a cursor on an attribute reference line a2 is referred to a movable point of a cursor on the transformation destination attribute reference line a3.
Figure 18C:
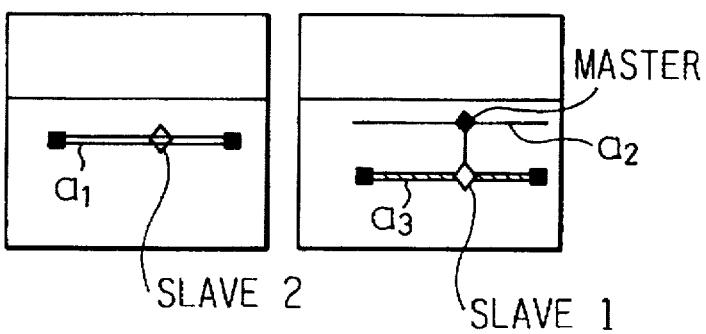
FIG. 18C indicates a step when appearances of both cursors of the destination attribute reference line a3 and the source attribute reference line a1 are changed.
Figure 18D:
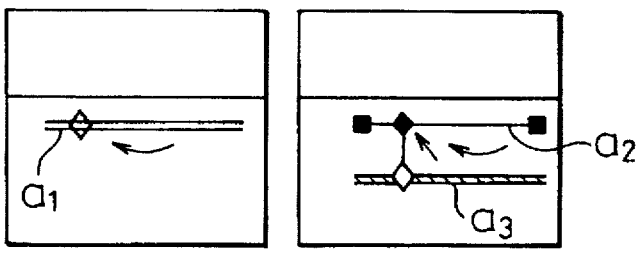
FIG. 18D indicates a step when the appearance of the attribute reference line a1 is changed on the left screen in response to a change of the attribute on the right screen.

FIG. 18A to FIG. 18D are explanatory drawings of an operational procedure for linking attributes by transformation. Each figure indicates two screens for attribute processes. FIG. 18A indicates a step when the transformation destination attribute reference line a3 for an attribute information is about to be selected on the right screen, and as a result the appearance of the transformation source attribute reference line a1 for an attribute information is changed on the left screen. FIG. 18B indicates a step when a movable point of a cursor (referred to as a movable point graphic) on an attribute reference line a2 is referred to a movable point of a cursor on the transformation destination attribute reference line a3. FIG. 18C indicates a step when the appearance of both cursors of the transformation destination attribute reference line a3 for a attribute information and attribute reference line for a transformation source attribute information a1 are changed. FIG. 18D indicates a step when the appearance of the transformation source attribute reference line a1 for an attribute information is changed on the left screen in response to a change of the attribute reference line a2 for an attribute information on the right screen. Here, two screens, shown on each side in FIG. 17 and FIG. 18, can be provided in attribute display area 19 to create attribute reference lines to be displayed in the display unit 11. It is also possible to provide only one screen in the display unit 11 for alternately displaying two different attribute reference lines.

Figure 19:
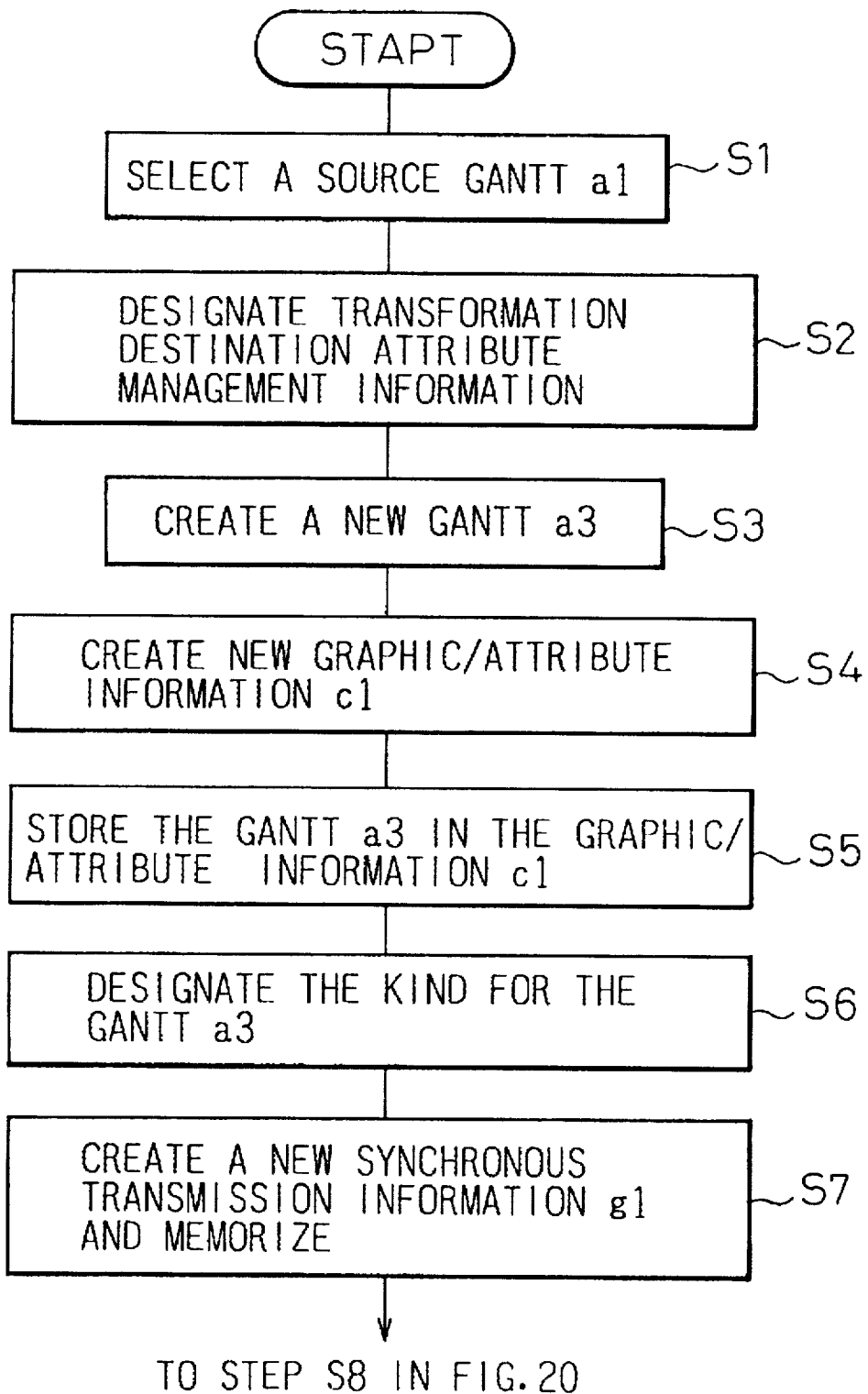
FIG. 19 is a half part of a flow chart of a process for creating transformation of attributes.
Figure 20:
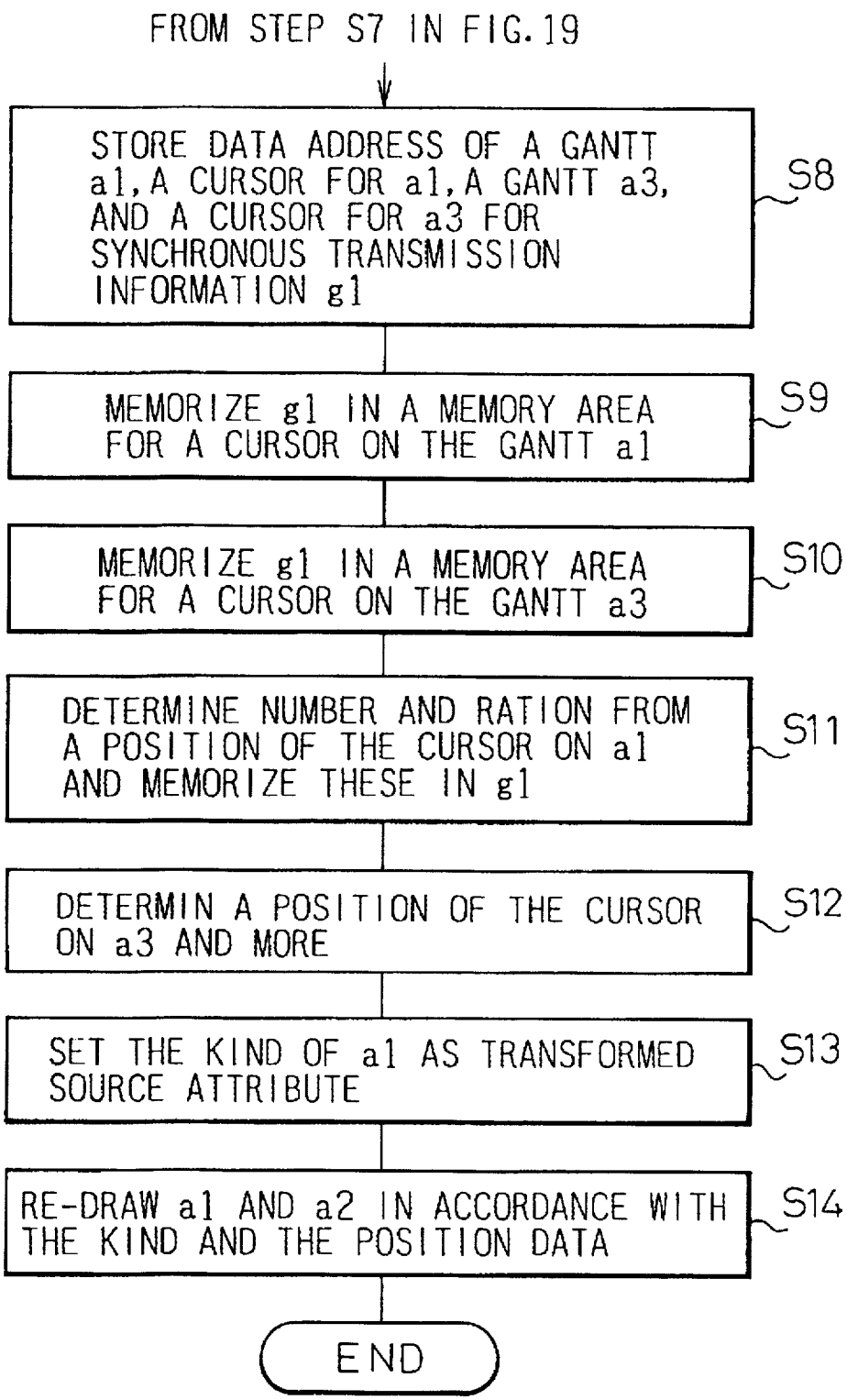
FIG. 20 is another half part of a flow chart of a process for creating transformation of attribute reference lines.

FIG. 19 and FIG. 20 are flow charts of processes for transformation of attribute reference lines. FIG. 19 and FIG. 20 will be explained referring to FIG. 17. In these drawings, attribute information a1 and a2 correspond to graphic/attribute information c1 and c2, and synchronous transmission information g1 and g2 respectively.

A source Gantt chart (referred to as an attribute reference line) a1 is selected to be transformed [refer to FIG. 17A and FIG. 17B] (Step S1).

Transformation destination attribute management information is designated thereby the cpu of the processing unit knows that a new Gantt chart (attribute reference line) is going to be created, in this case [refer to FIG. 17C] (Step S2).

A new Gantt chart a3 in transformation destination attribute management information is created [refer to FIG. 17D until step S13] (Step S3).

New graphic/attribute information c1 in new transformation group management information is created (Step S4).

An attribute information for the Gantt chart a3 is stored in the graphic/attribute information c1 (Step S5).

The kind of the attribute information for the Gantt chart a3 as a general attribute (neither a transformation source attribute nor a transformation destination attribute), a transformation source attribute, or a transformation destination attribute is designated (Step S6).

New synchronous transmission information g1 is created and memorized in the graphic/attribute information c1 (Step S7).

Data of address of Gantt chart information for a transformation source Gantt chart a1, a cursor information for the Gantt chart a1, Gantt chart information for a transformation destination Gantt chart a3, and a cursor information for the Gantt chart a3, are stored in a memory area of synchronous transmission information g1 for a graphic reference line no.1, a movable point graphic no.1, a graphic reference line no.2, and a movable point graphic no.2 respectively (Step S8).

Synchronous transmission information g1 is memorized in a memory area for a cursor on the transformation source Gantt chart a1 (Step S9).

Synchronous transmission information g1 is memorized in a memory area of a cursor on the transformation destination Gantt chart a3 (Step S10).

A section number and the ratio of the section number from a position of the cursor on the transformation source Gantt chart a1 are determined, and the section number and the ratio of the section number are memorized in the memory area of the synchronous transmission information g1 (Step S11).

A position of the cursor on the Gantt chart a3 is determined from the section number and the ratio of the section number memorized in the memory area of the synchronous transmission information g1, and are moved to the corresponding position (Step S12).

The kind of the attribute information for the Gantt chart a1 is memorized as transformed source attribute information (Step S13).

The attribute information for the Gantt charts a1 and a3 are re-drawn in accordance with the information of the kind and position data thereof (Step S14).

Figure 21:
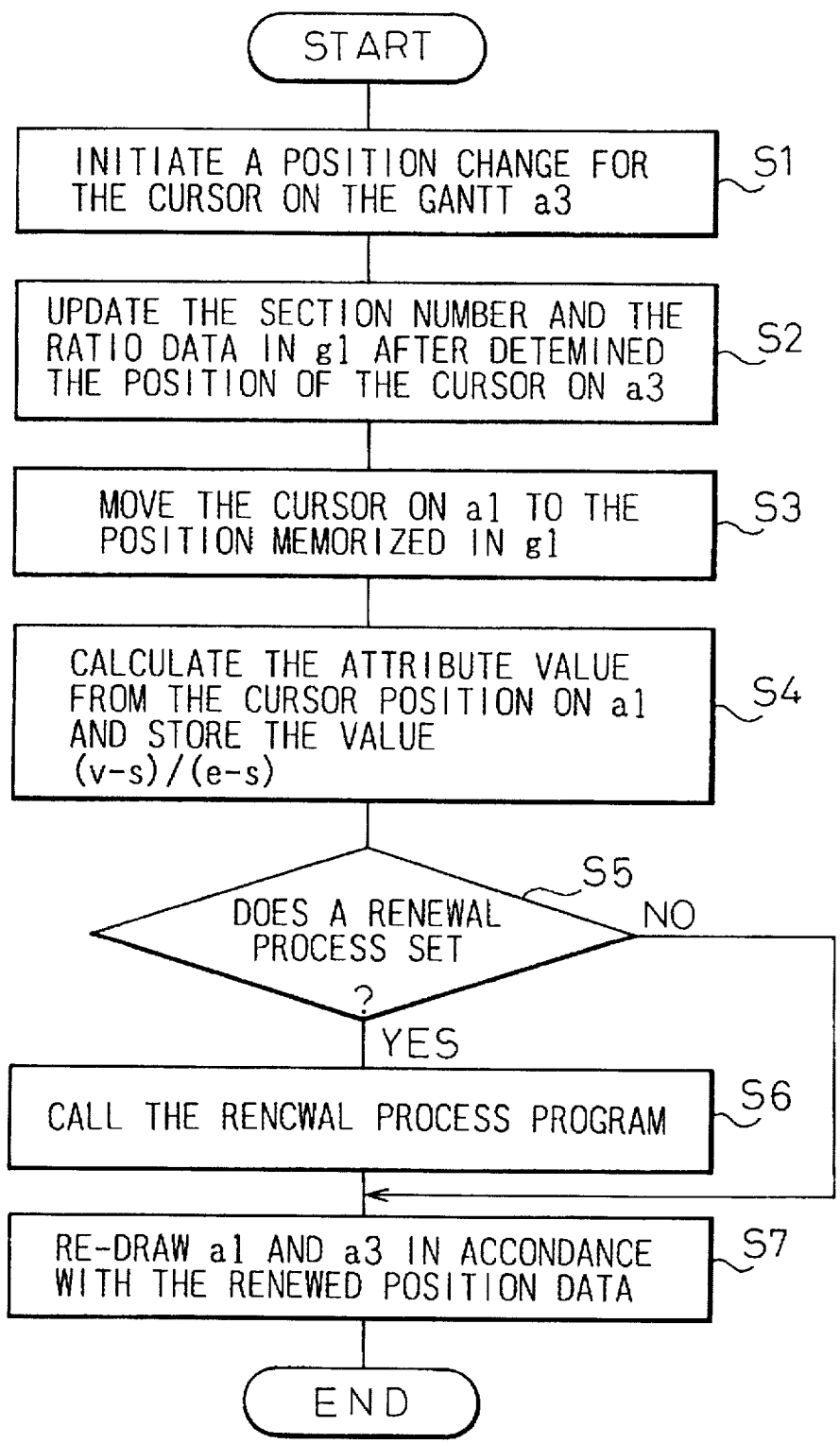
FIG. 21 shows a flow chart of a process upon renewal of source attribute value.

FIG. 21 shows a flowchart of a process upon renewal of transformation attribute value.

A position change command is initiated to change the position of the movable point graphic on the attribute reference line a3 by means of a mouse input or a program interface for renewing another attribute reference line a2 to which the movable point graphic refers (Step S1).

A section number and the ratio of the section number are determine from a position of the movable point graphic of the attribute reference line a3, and the section number and the ratio of the section number are updated in the memory area of the synchronous transmission information g1 (Step S2).

A position of the movable point graphic on the attribute reference line a1 is read from the section number and the ratio of the section number stored in the memory area of the synchronous transmission information g1, and the movable point graphic on the attribute reference line a1 is moved to the corresponding position (Step S3).

An attribute value is calculated from the position of the movable point graphic on the attribute reference line a1 and the calculated attribute value is stored (Step S4). The attribute value can be calculated from the equation below.

$$(v-s)/(e-s)$$

wherein v indicates an x coordinate value of the movable point graphic, s indicates a top x coordinate of a sequence of points of the Gantt chart (attribute reference line), and e indicates an end x coordinate of a sequence of points of the Gantt chart.

It is distinguished whether or not a renewal process program is set in response to attribute values of the attribute information for the attribute reference line a1 (Step S5).

If the result of the step S5 is yes, the renewal process program is called when renewing the attribute value of the attribute reference line a1 (Step S6).

The attribute reference lines a1 and a3 are re-drawn in accordance with the renewed position data (Step S7).

Figure 22:
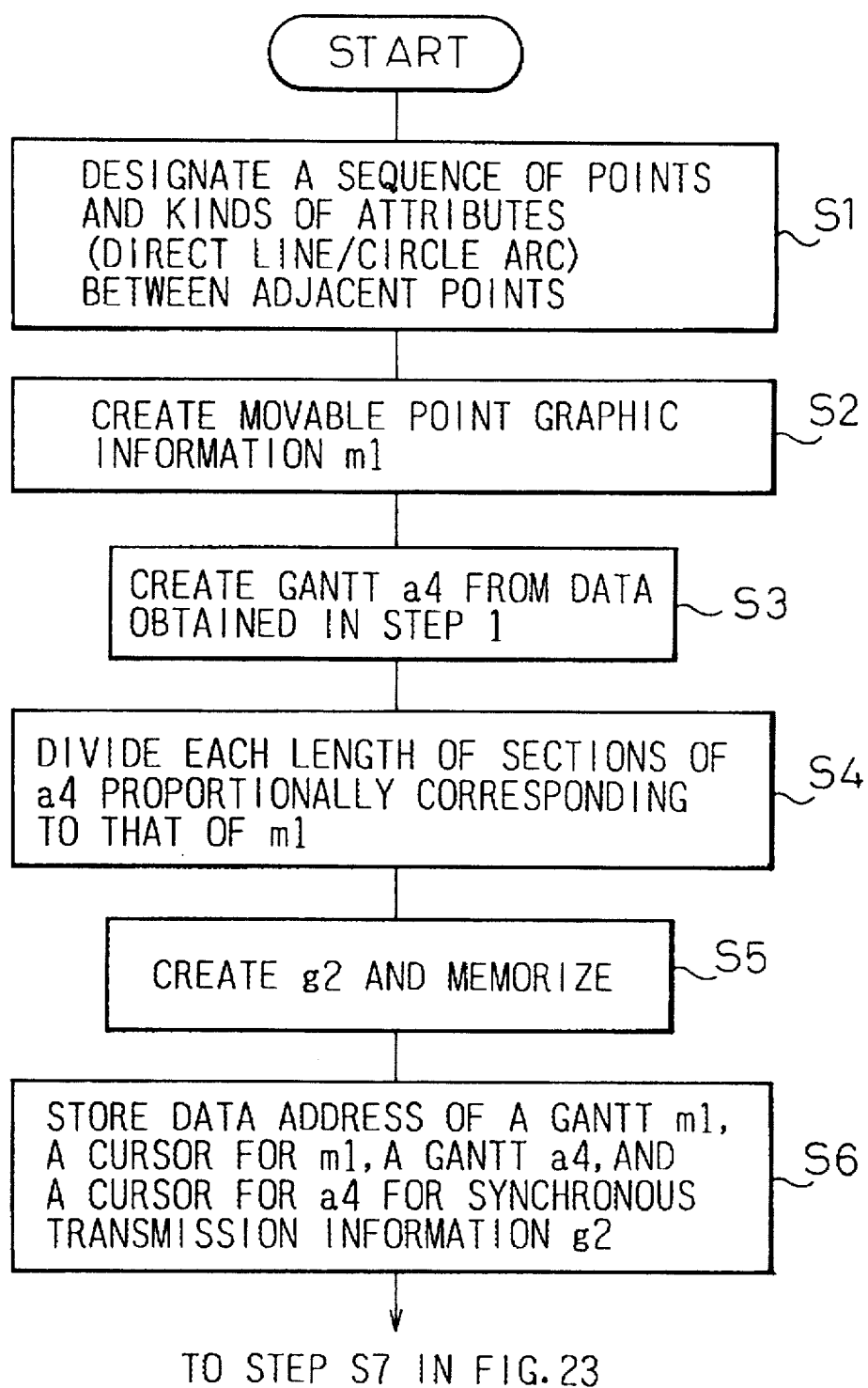
FIG. 22 is a half part of a flow charts of a process for creating a movable point graphic.
Figure 23:
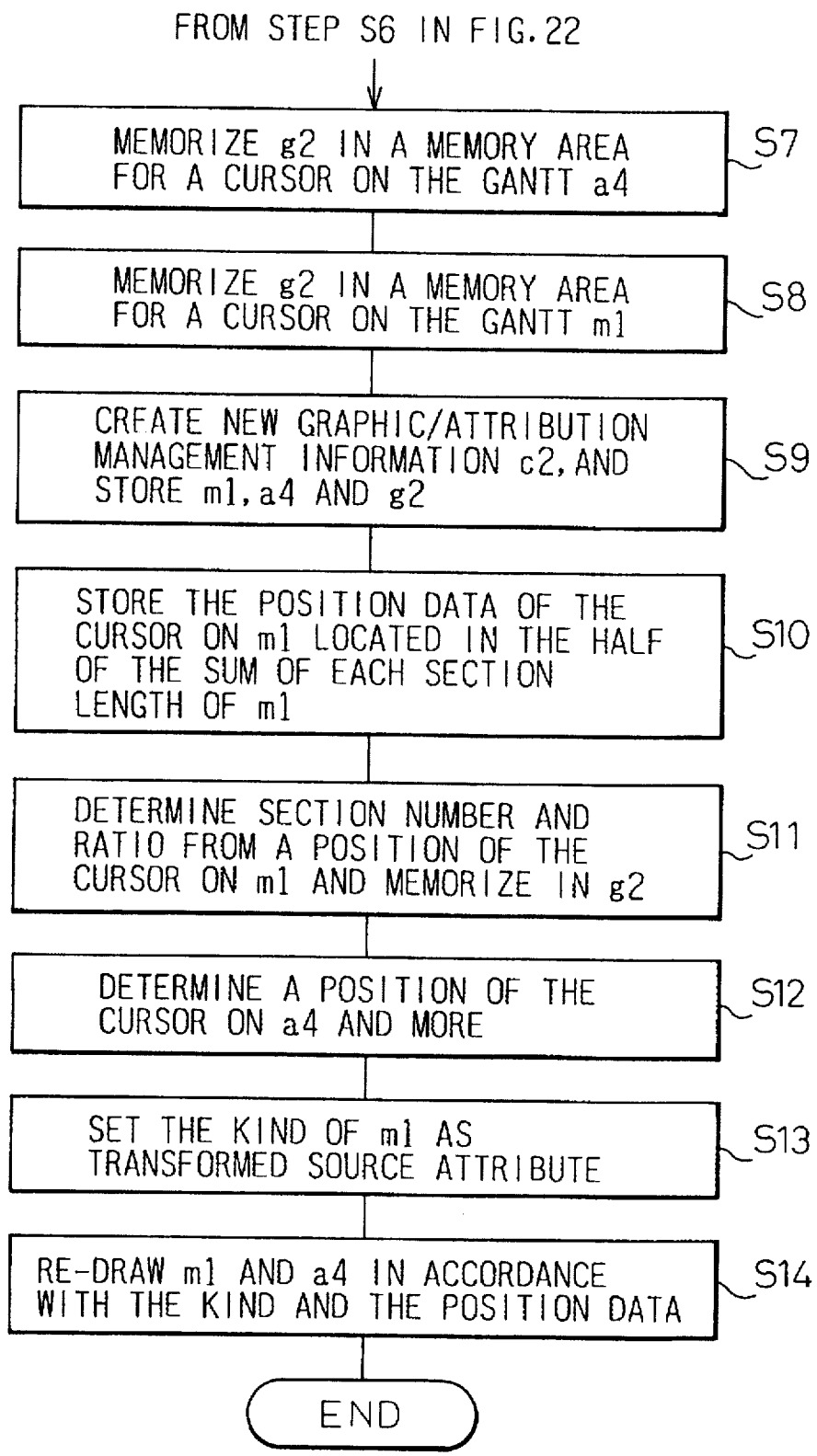
FIG. 23 is another half part of a flow charts of a process for creating a movable point graphic.

FIG. 22 and FIG. 23 are flow charts of a process for creating a movable point graphic. In these flow charts, attribute information for the attribute reference lines a1 and a4 correspond to graphic/attribute information c1 and c2, synchronous transmission information g1 and g2, and movable point graphic information m1 and m2, respectively.

A sequence of points and kinds of attributes of sections between the adjacent points are designated by means of a mouse input (Step S1). There are direct line and circle arc kinds of sections.

A new movable point graphic of the movable point graphic information m1 is created in accordance with the designated information designated by step S1 (Step S2).

An attribute information for the attribute reference line a4 that has the same number of a sequence of points as designated in step s1 is created (Step S3).

Each length of sections of the attribute reference line a4 corresponding to that of the movable point graphic information m1 is proportionally divided (Step S4).

A new synchronous transmission information g2 is created and memorized in the graphic/attribute information c2 (Step S5).

The synchronous transmission information is interposed between attribute information of the transformation source graphic and transformation destination graphic, and transmits address data of attribute information of the destination graphic for attribute information of the source graphic and address data of attribute information of the source graphic for attribute information of the destination graphic.

The data of address for Gantt chart information for a transformation source Gantt chart m1, a cursor information for the Gantt chart m1, Gantt chart information for a transformation destination Gantt chart a4, and a cursor information for the Gantt chart a4, are stored in a memory area of synchronous transmission information g2 for a graphic reference line no.1, a movable point graphic no.1, a graphic reference line no.2, and a movable point graphic no.2 respectively (Step S6).

Synchronous transmission information g2 is stored in a memory area for a movable point graphic on the transformation destination Gantt chart a4 (Step S7).

Synchronous transmission information g2 is stored in a memory area of a movable point graphic on the transformation source Gantt chart ml (Step S8).

New graphic/attribute management information c2 is created as current group management information and graphic header information m1, attribute information a4, synchronous transmission information g2 are stored (Step S9).

The position data of the movable point graphic of movable point graphic information ml are stored in the half of the sum of each section length thereof (Step S10).

A section number and the ratio of the section number from a position of the movable point graphic on the transformation source Gantt chart m1 is determined, and the section number and the ratio of the section number are stored in the memory area of the synchronous transmission information g2 (Step S11).

A position of the movable point graphic on the attribute reference line a4 is determined from the section number and the ratio of the section number stored in the memory area of the synchronous transmission information g2, and the movable point graphic is moved to the corresponding position (Step S12).

The kind of the attribute information m1 is memorized as source attribute information (Step S13).

The Gantt charts ml and a4 are re-drawn in accordance with the information of the kind and position data thereof (Step S14).

Figure 24:
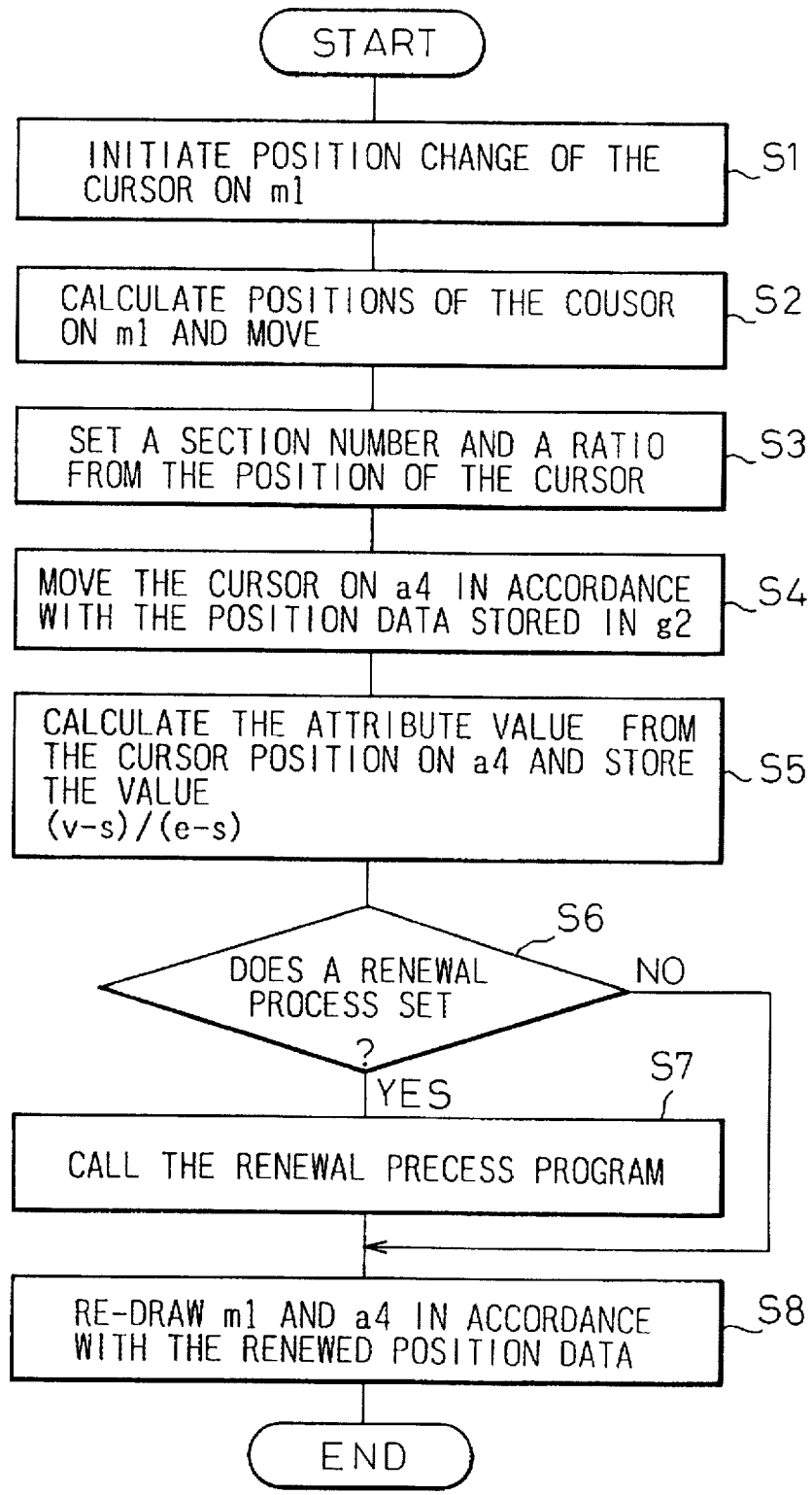
FIG. 24 is a flow chart of a process of changing attribute values by means of positions of a movable point graphic.

FIG. 24 is a flow chart of a process of changing attributes values by means of positions of a movable point graphic.

A position change command is initiated to change the position of the movable point graphic on the attribute reference line of the attribute information m1 by means of a mouse input or a program interface for renewing another attribute to which the movable point graphic refers (Step S1).

The position of a movable point graphic of movable point graphic information m1 are calculated and the movable point graphic is moved in accordance with the result (Step S2).

A section number and a ratio of the section number are determined from a position of the movable point graphic information m1, and the section number and the ratio of the section number are memorized in the memory area of the synchronous transmission information g2 (Step S3).

A position of the movable point graphic on the attribute reference line of attribute information m1 is determined from section number and the ratio of the section number stored in the memory area of the synchronous transmission information g2, and the movable point graphic is moved to the corresponding position (Step S4).

The attribute value from the position of the movable point graphic of the attribute information a4 is calculated and the calculated attribute value is stored (Step S5). The attribute value can be calculated by the equation below.

$$(v-s)/(e-s)$$

wherein v indicates x coordinate value of the movable point graphic, s indicates top x coordinate of a sequence of points of the Gantt chart (attribute reference line), and e indicates end x coordinate of a sequence of points of the Gantt chart.

It is distinguished whether or not a renewal process program is set in response to attribute values of the attribute information a4 (Step S6).

If the result of the step S6 is yes, the renewal process program is called when renewing the attribute value of the attribute information a4 (Step S7).

The attribute reference lines of attribute information ml and a4 are re-drawn in accordance with the renewed position data (Step S8).

FIG. 25A to FIG. 25C are drawings showing a sample of graphics created and edited by means of transformation according to the present invention. FIG. 25A shows a meter on the right side and a slider having a released cursor on the left side. FIG. 25B shows the meter and the slider after the cursor on the slider is moved by a mouse. FIG. 25C shows two attribute display screens, one for a destination attribute reference line for a1, namely a meter, on the right, the other for an attribute reference line for a2, namely a slider, and an attribute reference line for a3, namely a meter source from the attribute reference line for a1 of the meter, on the left. As shown by FIG. 25A to FIG. 25C, it is understood that when an attribute value of a graphic is changed, an attribute value of the other graphic is also changed.

Figure 26A:
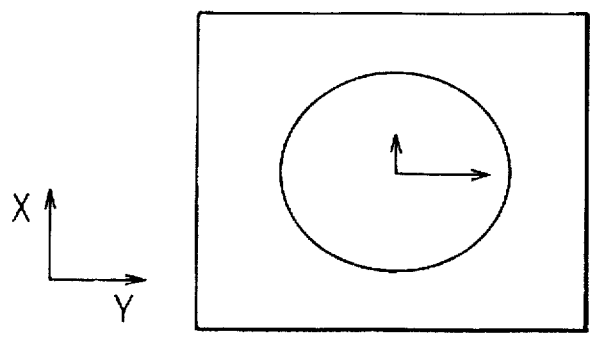
FIG. 26A shows a clock having a circle front view.
Figure 26B:
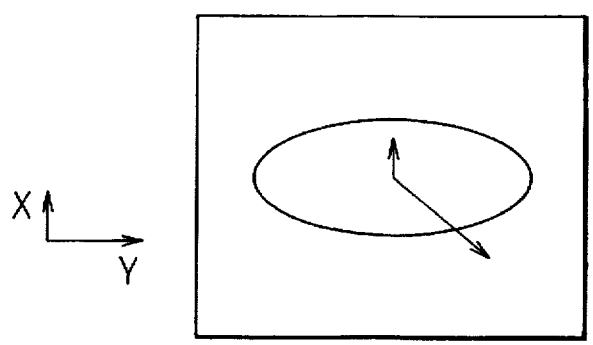
FIG. 26B shows an enlarged graphic of the clock shown in FIG. 26A in the direction of x axis according to prior art.
Figure 26C:
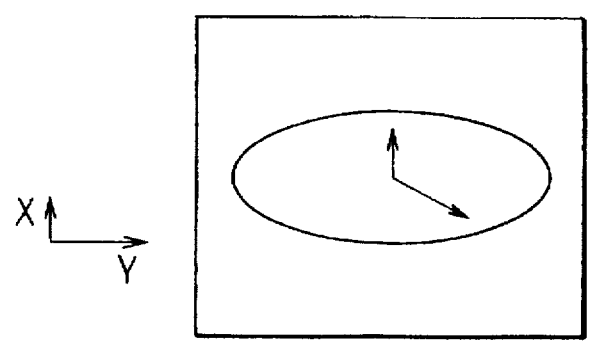
FIG. 26C shows an enlarged graphic of the clock shown in FIG. 26A in the direction of x axis according to the present invention.

FIG. 26A to FIG. 26C are explanatory drawings for editing graphics by means of coordinate transformation according to the present invention. FIG. 26A shows a clock having a circle front view. FIG. 26B shows an enlarged graphic of the clock shown in FIG. 26A in the direction of x axis according to prior art. It can be seen that the circle is deformed into an ellipse and the pointer of the clock is extended toward outside of the ellipse. FIG. 26C shows an enlarged graphic of the clock shown in FIG. 26A in the direction of x axis according to the present invention. It can be seen that the circle is deformed into an ellipse but the pointer of the clock is within the ellipse.

Figure 27A:
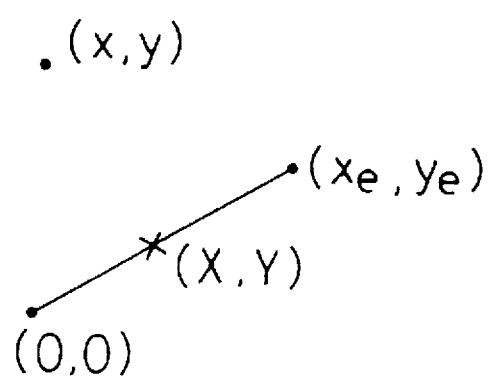
FIG. 27A is an explanatory drawing of the linear interpolation according to the present invention.
Figure 27B:
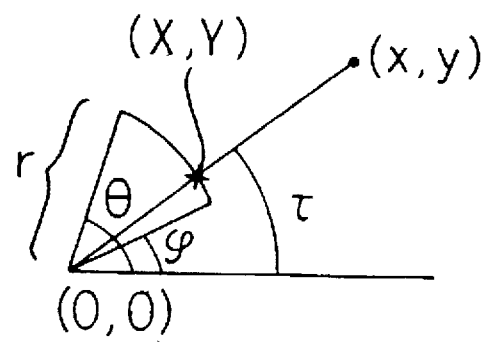
FIG. 27B is an explanatory drawing of the circular interpolation according to the present invention.

FIG. 27A and FIG. 27B are explanatory drawings for interpolation according to the present invention. FIG. 27A is an explanatory drawing of the linear interpolation and FIG. 27B is an explanatory drawing of the circular interpolation. FIG. 27A indicates that an arbitrary point (X, Y) on a line between a point (0,0) and a point (Xe, Ye) is given by the following equation.

$(X,Y)=(0,0)$ when $\beta<0$ $(X,Y)=(\alpha Xe, \alpha Ye)$ when $0 \leq \alpha \leq 1$ $(X,Y)=(Xe, Ye)$ when $1<\alpha$ wherein $\alpha=(Xe \cdot x + Ye \cdot y)/(Xe^2 + Ye^2)$ FIG. 27B indicates that an arbitrary point (X, Y) on a circle arc between a point with the radian r and the angle $\tau=\theta$ and another point with the radian r and the angle $\tau=\phi$ is given by the following equation.

$(X,Y)=(r \times \cos \phi, r \times \sin \phi)$ when $\tau<\phi$ $(X,Y)=(r \times \cos \tau, r \times \sin \tau)$ when $\phi \leq \tau \leq \theta$ $(X,Y)=(r \times \cos \theta, r \times \sin \theta)$ when $\theta<\tau$ wherein $\theta=\tan^{-1}(y/x)$, and (x,y) indicate arbitrary point)

Figure 28:
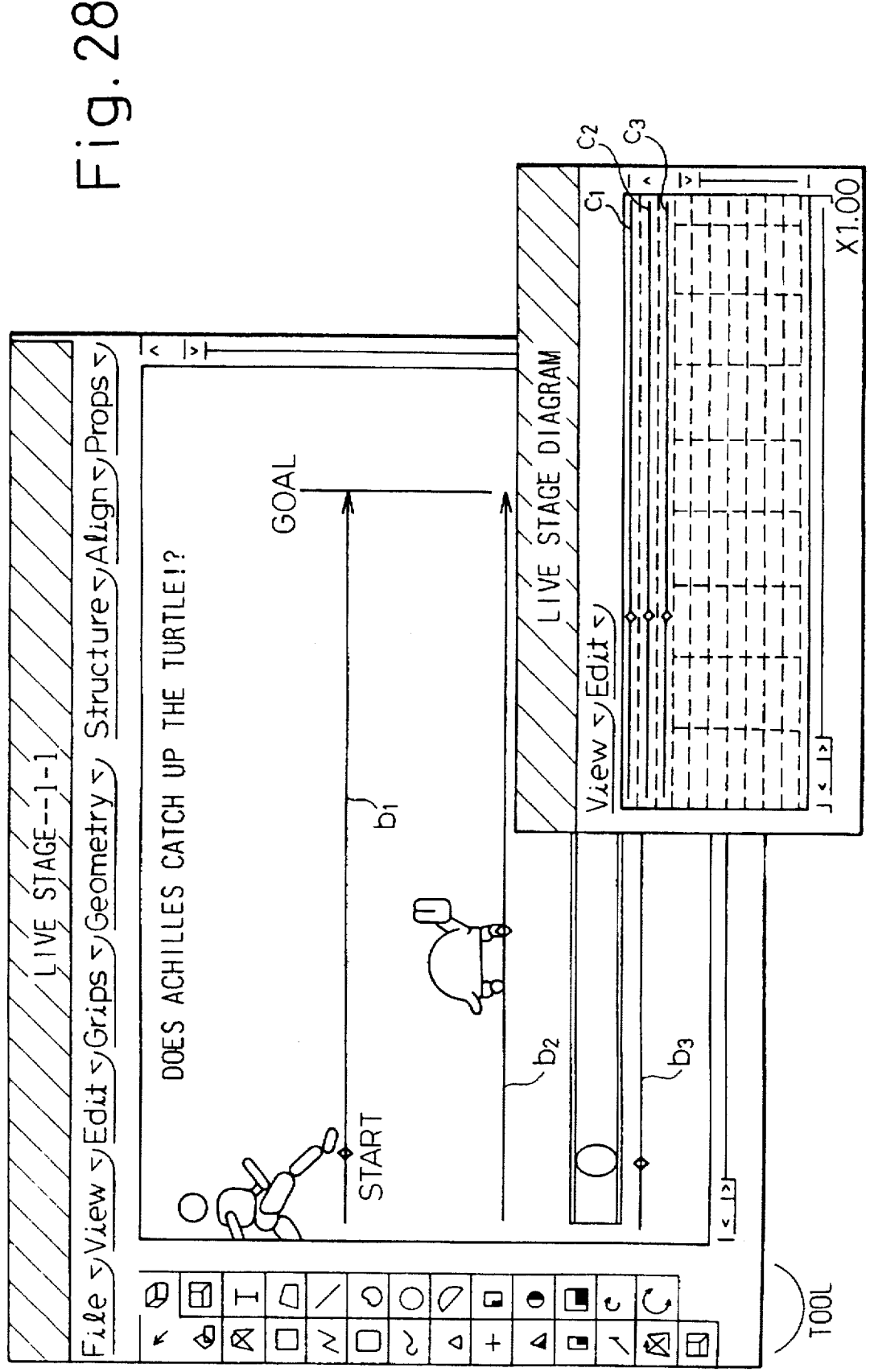
FIG. 28 indicates an example of a graphic edited by means of interpolation arithmetic according to the present invention.

FIG. 28 indicates an example of a graphic edited in accordance with interpolation arithmetic according to the present invention. The FIG. 28 shows a screen of the graphic editing apparatus of the present invention. Each signs shown in two rows of the screen on the left side are tools used for creating or editing graphics. Eight words indicated by alphabet on the upper of the screen such as File, View, Edit, Grips, Geometry, Structure, Align, and Props, indicates 8 menus. From upper left to the lower right of the screen in the graphic display, an Achilles, a turtle and a slider are shown, and each graphic reference line thereof, b1, b2 and b3 are respectively shown underneath of each of these graphics. On the bottom right, attribute reference lines c1, c2 and c3 corresponding the Achilles, the turtle and the slider are shown in an attribute display area. It is possible to edit a screen according to the present invention in a manner that the Achilles moves from left to right at twice faster speed than that of the turtle, and the Achilles passes the turtle at the vertical line indicated "goal".

According to the present invention for graphic editing method and apparatus, in particular by means of the attribute transformation creating means, it is performed that editing operations of a graphic or a group graphic having a plurality of graphics to be changed related with another graphic or another group graphic, for example, editing the graphic or the group graphic to be changed in the same way as changes of the related graphic resulting from movement, deformation, rotation or enlargement. More concretely, a graphic correlated with another graphic can be edited to rotate clockwise or counterclockwise corresponding to up or down movement of the another graphic.

According to the second aspect of the present invention for graphic editing method and apparatus, in particular by means of the released point creating means for setting a released point in a desired graphic in a group graphic having a plurality of graphics, editing operations of a desired graphic can be independently performed based on changes resulting from movement, deformation, rotation, enlargement, or the like of the desired graphic. Therefore, editing operations on group graphics become easier than prior art. More practically, a pointer can be freely edited to be moved in a group graphic having a pointer and a meter.

According to the third aspect of the present invention for graphic editing method and apparatus, in particular by means of coordinate editing means, editing operations with coordinate transformation of a lower graphic or a lower group graphic in a hierarchically structured graphic consisting of upper and lower graphics and/or upper and lower group graphics can be independently performed. More practically, a rectangle created after focus-in to a group graphic in a sub hierarchically structured graphic of which a coordinate is distorted, a distorted rectangle can be displayed after focus-out.

According to the fourth aspect of the present invention for graphic editing method and apparatus, in particular by means of a movable point graphic position setting means and an attribute changing means, displaying operations of numerical data corresponding to a change of a graphic resulting from movement, deformation, rotation, enlargement, or the like, or displaying operations of a change of another graphic resulting from movement, deformation, rotation, enlargement, or the like, corresponding to the change of the graphic resulting from movement, deformation, rotation, enlargement, or the like, can be performed. More practically, the brightness of background of a screen or a pointer of a clock may be changed in accordance with the sun rising from the east until the sun sets to the west.

We claim:

1. A graphic editing method for creating or editing graphics, the method using a graphic editing apparatus which includes a processing unit for creating or editing graphics to be displayed on a screen, a display unit for displaying said graphics created or edited on said screen, and a position designating unit for use in designating positions on said screen of said display unit and inputting said position data to said processing unit, a first graphic and a second graphic being displayed on said screen, the method comprising the steps of:

creating a graphic reference line in a graphic display area on said screen by transforming attribute changes resulting from movement, deformation, rotation, enlargement, color, or the like, of the first graphic into changes of positions on said screen of said display unit, the graphic reference line having a corresponding coordinate system;

creating a first attribute reference line in an attribute display area on said screen by transforming said graphic reference line into changes of positions on said screen of said display unit, the first attribute reference line having a corresponding coordinate system, the coordinate system of said first attribute reference line being independent from the coordinate system of said graphic reference line;

creating a second attribute reference line transformed from said first attribute reference line in said attribute display area as an attribute reference line corresponding to said second graphic, the second attribute reference line having a corresponding coordinate system, the coordinate system of said second attribute reference line being independent from the coordinate system of the first attribute reference line;

creating synchronous transmission information which includes address data of attribute information for said first attribute reference line corresponding to attribute information of said second attribute reference line and address data for attribute information of said second attribute reference line corresponding to attribute information of said first attribute reference line, for allowing attribute information to be exchanged between said first attribute reference line and said second attribute reference line; and editing graphics so that an attribute of said second graphic is changeable in response to a change of an attribute of said first graphic.

2. A graphic editing method for creating or editing graphics, the method using a graphic editing apparatus having a processing unit for creating or editing graphics to be displayed on a screen, a display unit for displaying said graphics created or edited on said screen, and a position designating unit for designating positions on said screen of said display unit and inputting said position data to said processing unit, a group graphic which includes a plurality of graphics being displayed on the screen and being surrounded by a group frame graphic, a respective graphic of the plurality of graphics being a selected graphic having a corresponding coordinate system, the method comprising the steps of:

determining at least one point as a released source point HP1 in the selected graphic;

determining a release destination point HP2 projected from said release source point HP1 in a space having a coordinate system independent from the coordinate system of said selected graphic;

creating a virtual release point RP between said release source point HP1 and said release destination point HP2;

correlating said virtual release point RP to an attribute of the selected graphic;

storing said released source point HP1 and said group frame graphic as group frame graphic information;

storing graphics inside said group frame graphic other than said selected graphic as stationary graphic information;

moving said release destination point HP2;

changing a value of the attribute of the selected graphic correlated to said virtual release point RP in response to said movement of said release destination point HP2;

displaying said graphics stored as said stationary graphic information without any change; and displaying said selected graphic so as to be independently changed from movement, deformation, rotation, enlargement, or the like, of said selected graphic.

3. A graphic editing method for creating or editing a main hierarchically structured graphic forming a hierarchical structure with a plurality of graphics and a plurality of group graphics, the method using a graphic editing apparatus having a processing unit for creating or editing graphics to be displayed on a screen, a display unit for displaying said graphics created or edited on said screen, and a position designating unit for use in designating positions on said screen of said display unit and inputting said position data to said processing unit, the method comprising the steps of:

storing coordinate transformation information corresponding to said main hierarchically structured graphic in a main group management information for managing said main hierarchically structured graphic;

storing coordinate transformation information corresponding to a sub-hierarchically structured graphic in a sub-group management information for managing a sub-hierarchically structured graphic having a determined group graphic, said main hierarchically structured graphic including said sub-hierarchically structured graphic as a lower class;

transforming a coordinate of said sub-hierarchically structured graphic based on said coordinate transformation information stored in said sub-group management information independent from said coordinate transformation information corresponding to said main hierarchically structured graphic when editing said sub-hierarchically structured graphic; and displaying said sub-hierarchically structured graphic in accordance with the transformed coordinate of said sub-hierarchically structured graphic.

4. A graphic editing method as claimed in claim 3, wherein said coordinate transformation information in group management information which manages said group graphic is obtained by multiplying each coordinate transformation information in series in each group management information of each group graphic having hierarchically structured relationship between said group graphics.

5. A graphic editing method as claimed in claim 3, wherein said coordinate transformation information in group management information is obtained from coordinate transformation information in said group management information of the highest hierarchical group graphic of all the group graphics having a hierarchically structured relationship.

6. A graphic editing method for creating or editing a plurality of graphics utilizing a graphic editing apparatus having a processing unit for creating or editing graphics to be displayed on a screen, a display unit for displaying said graphics created or edited on said screen, and a position designating unit for use in designating positions on said screen of said display unit and inputting said position data to said processing unit, the method comprising the steps of:

creating a graphic reference line having a first movable point in a graphic display area on said screen of said display unit, which is obtained by transforming changes of attributes resulting from movement, deformation, rotation, enlargement, color, or the like, of a determined graphic into changes of positions on said screen;

creating an attribute reference line in an attribute display area on said screen of said display unit, which is obtained by transforming said graphic reference line into changes of position on said screen;

interpolating the positions of said first movable point graphic on said graphic reference line corresponding to changes of said attribute to obtain numerical data;

moving said first movable point graphic on said graphic reference line in accordance with said numerical data;

moving a second movable point graphic on said attribute reference line in accordance with changes of positions of said first movable point graphic on said graphic reference line; and calculating numerical data corresponding to changes of said attribute of said determined graphic from changes of positions of said second movable point graphic on said attribute reference line.

7. A graphic editing method as claimed in claim 6, wherein said numerical data or a change resulting from movement, deformation, rotation, enlargement, color, or the like, of a graphic is displayed in response to changes of said attributes.

8. A graphic editing apparatus for creating or editing graphics of group graphics, each group graphic including a plurality of graphics and being handled as a single graphic, the apparatus comprising:

a processing unit for creating or editing graphics to be displayed on a screen;

a display unit for displaying said graphics created or edited on said screen;

a position designating unit for use in designating positions on said screen of said display unit and inputting said position data to said processing unit;

a graphic editing means for creating graphic reference lines in a graphic display area on said screen, which are defined by transforming attribute changes resulting from movement, deformation, rotation, enlargement, color, or the like, of a first graphic in said first and a second graphics or in said first graphic and a first group graphic, or a first group graphic in said first and a second group graphics or in said first graphic and said first group graphic, into changes of positions on said screen of said display unit;

a graphic displaying means for displaying graphics or said graphic reference lines created by said graphic editing means in said graphic display area;

an attribute editing means for creating attribute reference lines in an attribute display area on said screen which are defined by transforming said attribute changes into changes of positions on said screen; and an attribute displaying means for displaying said attribute reference lines created by said attribute editing means in said attribute display area;

wherein said attribute editing means comprises means for selecting one of said attribute reference lines as a first attribute reference line, means for creating a second attribute reference line transformed from said first attribute reference line in said attribute display area as an attribute reference line corresponding to said second graphic or said second group graphic, means for creating synchronous transmission information which includes address data for attribute information of said first attribute reference line corresponding to attribute information of said second attribute reference line and address data for attribute information of said second attribute reference line corresponding to attribute information of said first attribute reference line, and means for editing graphics so that said attribute of said second graphic or said second group graphic may be changed in response to a change of said attribute of said first graphic or said first group graphic by an attribute transforming means.

9. A graphic editing apparatus for creating or editing group graphics each including a plurality of graphics and being handled as a single graphic, the apparatus comprising:

a processing unit for creating or editing graphics to be displayed on a screen;

a display unit for displaying said graphics created or edited on said screen;

a position designating unit for use in designating positions on said screen of said display unit and inputting said position data to said processing unit;

a graphic editing means for creating graphic reference lines in a graphic display area on said screen, which are defined by transforming attribute changes resulting from movement, deformation, rotation, enlargement, color, or the like, of a first graphic in said first and a second graphics or in said first graphic and a first group graphic, or a first group graphic in said first and a second group graphics or in said first graphic and said first group graphic, into changes of positions on said screen of said display unit;

a graphic displaying means for displaying graphics or said graphic reference lines created by said graphic editing means in said graphic display area;

an attribute editing means for creating attribute reference lines in an attribute display area on said screen which are defined by transforming said graphic reference lines into changes of positions on said screen of said display unit; and an attribute displaying means for displaying said attribute reference lines created by said attribute editing means in said attribute display area;

wherein said graphic editing means (14) comprises means for determining at least one point as a released point in a determined graphic inside of a group frame graphic surrounding a group graphic containing a plurality of graphics, means for storing said released point and said group frame graphic as group frame graphic information, means for storing graphics inside said group frame graphic other than said determined graphic having said released point as stationary graphic information, means for displaying said graphics stored as said stationary graphic information without any change, and means for editing said group graphic, to be displayed by a group graphic creating means, such that only said determined graphic having said released point so as to be independently changed resulting from movement, deformation, rotation, enlargement, or the like of said determined graphic.

10. A graphic editing apparatus for creating or editing a main hierarchically structured graphic forming a hierarchical structure with a plurality of graphics and a plurality of group graphics, the apparatus comprising:

a processing unit for creating or editing graphics to be displayed on a screen;

a display unit for displaying said graphics created or edited on said screen, a position designating unit for use in designating positions on said screen of said display unit and inputting said position data to said processing unit;

a graphic editing means for creating graphic reference lines in a graphic display area on said screen, which are defined by transforming attribute changes resulting from movement, deformation, rotation, enlargement, color, or the like, of a first graphic in said first and a second graphics or in said first graphic and a first group graphic, or a first group graphic in said first and a second group graphics or in said first graphic and said first group graphic, into changes of positions on said screen of said display unit;

a graphic displaying means for displaying graphics or said graphic reference lines created by said graphic editing means in said graphic display area;

an attribute editing means for creating attribute reference lines in an attribute display area on said screen which are defined by transforming said graphic reference lines into changes of positions on said screen of said display unit; and an attribute displaying means for displaying said attribute reference lines created by said attribute editing means in said attribute display area;

wherein said graphic editing means comprises means for storing coordinate transformation information for said main hierarchically structured graphic in a main group management information for managing said main hierarchically structured graphic and coordinate transformation information for a sub-hierarchically structured graphic in sub-group management information for managing a sub-hierarchically structured graphic having a determined group graphic, said main hierarchically structured graphic including said sub-hierarchically structured graphic as a lower class, means for transforming a coordinate of said sub-hierarchically structured graphic based on said coordinate transformation information stored in said subgroup management information by means of coordinate editing means when editing said sub hierarchically structured graphic, and means for displaying said sub hierarchically structured graphic in accordance with the transformed coordinate of said sub hierarchically structured graphic.

11. A graphic editing apparatus as claimed in claim 10, wherein said coordinate transformation information in group management information which manages said group graphic is obtained by multiplying each coordinate transformation information in series in each group management information of each group graphic having hierarchically structured relationship between said group graphics.

12. A graphic editing apparatus as claimed in claim 10, wherein said coordinate transformation information in group management information is obtained from coordinate transformation information in said group management information of the highest hierarchical group graphic of all group graphics having hierarchically structured relationship.

13. A graphic editing apparatus for creating or editing a plurality of graphics, the apparatus comprising:

a processing unit for creating or editing graphics to be displayed on a screen;

a display unit for displaying said graphics created or edited on said screen;

a position designating unit for use in designating positions on said screen of said display unit and inputting said position data to said processing unit;

a graphic editing means for creating graphic reference lines in a graphic display area on said screen, which are obtained by transforming attribute changes resulting from movement, deformation, rotation, enlargement, color, or the like of a graphic or a group graphic in two graphics, in a graphic and a group graphic, or in two group graphics, into changes of positions on said screen of said display unit;

a graphic displaying means for displaying graphics or said graphic reference lines created by said graphic editing means in said graphic display area;

an attribute editing means for creating attribute reference lines in an attribute display area on said screen which are defined by transforming said graphic reference lines into changes of positions on said screen; and an attribute displaying means for displaying said attribute reference lines created by said attribute editing means in said attribute display area, wherein said graphic editing means comprises means for creating a graphic reference line having a first movable point in a graphic display area on said screen of said display unit, which is obtained by transforming changes of attributes resulting from movement, deformation, rotation, enlargement, color, or the like, of a determined graphic into changes of positions on said screen, means for interpolation of positions of said first movable point graphic on said graphic reference line corresponding to changes of said attribute to obtain numerical data, and means for moving said first movable point graphic of said graphic reference line in accordance with said numerical data, and said attribute editing means comprises means for creating an attribute reference line in an attribute display area on said screen of said display unit, which is defined by transforming changes of graphic reference line into changes of positions on said screen, means for moving a second movable point graphic on said attribute reference line in accordance with changes of positions of said first movable point graphic of said graphic reference line, and means for calculating numerical data corresponding to changes of said attribute of said determined graphic from changes of positions of said second movable point graphic of said attribute reference line.

14. A graphic editing apparatus as claimed in claim 13, wherein said numerical data or a change resulting from movement, deformation, rotation, enlargement, color, or the like of a graphic is displayed in response to changes of said attributes.

15. A graphic editing method for editing a first graphic and a second graphic, the first graphic and the second graphic each displayed with a corresponding view in a corresponding coordinate system on a screen and being correlated to each other, the first graphic and second graphic each having an attribute with a changeable value, the method comprising the steps of:

creating a first change reference graphic representing changes in the value of the attribute of the first graphic and a second change reference graphic representing changes in the value of the attribute of the second graphic;

creating a first attribute graphic projected from the first change reference graphic and representing changes in the value of the attribute of the first graphic, and a second attribute graphic projected from the second change reference graphic and representing changes in the value of the attribute of the second graphic, the first attribute graphic and the second attribute graphic being projected in a space having a coordinate system independent from the coordinate system of the first graphic and the coordinate system of the second graphic;

correlating a position in the first attribute graphic to a position in the second attribute graphic;

detecting a change in the value of the attribute of the first graphic in response to a change in the view of the first graphic;

detecting a position change in the first attribute graphic via the first change reference graphic in response to the detected change in the value of the attribute of the first graphic;

detecting a position change in the second attribute graphic in response to the detected position change in the first attribute graphic;

detecting a change in the value of the attribute of the second graphic via the second change reference graphic in response to the detected position change in the second attribute graphic; and changing the view of the second graphic in response to the detected change in the value of the attribute of the second graphic.

16. A graphic editing method as in claim 15, wherein the attribute of the first graphic and the attribute of the second graphic are selected from the group comprising movement, deformation and color.

17. A graphic editing method as claimed in claim 15, wherein the first attribute graphic and the second attribute graphic are projected in a space having the same coordinate system for both the first attribute graphic and the second attribute graphic.

18. An apparatus for editing a first and second graphic displayed on a screen and correlated to each other, comprising:

first and second intermediate editors respectfully corresponding to the first and second graphics, each of the first and second intermediate editors for editing the corresponding graphic by transmitting information related to changes in an attribute of the corresponding graphic to the other intermediate editor, receiving information from the other intermediate editor related to changes in an attribute of the graphic corresponding to the other intermediate editor, and changing an attribute of the corresponding graphic in response to information received from other intermediate editor; and means for displaying a view of the first and second graphics on the screen in accordance with editing of the first and second graphics by the first and second intermediate editors, to thereby display a view of the first graphic responsive to changes in an attribute of the second graphic and display a view of the second graphic responsive to changes in an attribute of the first graphic.

19. A graphic editing method as in claim 18, wherein the attribute of the first graphic and the attribute of the second graphic are selected from the group comprising movement, deformation and color.

20. A graphic editing method for editing a group graphic which includes a plurality of graphics, each graphic of the plurality of graphics having a coordinate system and a view of each graphic being displayed on a screen, the method comprising the steps of:

selecting a graphic for editing from the plurality of graphics of the group graphic;

creating a projected point in a space having a coordinate system independent from the coordinate system of the selected graphic, the projected point being correlated to an attribute of the selected graphic;

moving the projected point in the space;

changing the value of the attribute of the selected graphic in response to the movement of the projected point; and changing the view of the selected graphic on the screen in response to the change in the value of the attribute of the selected graphic.

21. A graphic editing method as in claim 20, wherein the attribute of the selected graphic is selected from the group comprising movement, deformation and color.

22. A graphic editing method for editing a group graphic which includes a plurality of graphics, each graphic of the plurality of graphics having a coordinate system, and a view of each graphic being displayed on a screen, the method comprising the steps of:

selecting a graphic for editing from the plurality of graphics of the group graphic;

determining a release source point HP1 on the selected graphic;

determining a release destination point HP2 projected from the release source point to a space having a coordinate system independent from the coordinate system of the selected graphic;

creating a virtual release point RP between the release source point HP1 and the release destination point HP2;

correlating the virtual release point RP to an attribute of the selected graphic;

moving the release destination point HP2;

changing the value of the attribute of the selected graphic in response to the movement of the release destination point HP2; and changing the view of the selected graphic on the screen in response to the change of the value of the attribute of the selected graphic.

23. A graphic editing method as in claim 22, wherein the attribute of the selected graphic is selected from the group comprising movement, deformation and color.

* * * * *

UNITED STATES PATENT AND TRADEMARK OFFICE
CERTIFICATE OF CORRECTION

PATENT NO. : 5,642,475
DATED : June 24, 1997
INVENTOR(S) : ITOH et al.

It is certified that error appears in the above-identified patent and that said Letters Patent is hereby corrected as shown below:

Col. 25, line 41, change "ml" to --m1--;
           line 63, change "ml" to --m1--.

Col. 26, line 37, change "ml" to --m1--.

Col. 27, line 7, change "$\beta<0$" to --$\alpha<0$--;
           line 14, change "angle $\tau=\theta$" to --angle $\tau=\phi$--;
           line 15, change "angle $\tau=\phi$" to --angle $\tau=\theta$--;
           line 23, change "$\theta=\tan^{-1}$" to --$\tau=\tan^{-1}$--.

Signed and Sealed this

Thirtieth Day of September, 1997

*Attest:*

BRUCE LEHMAN

*Attesting Officer*        *Commissioner of Patents and Trademarks*